United States Patent [19]

Takasa et al.

[11] Patent Number: 4,525,396
[45] Date of Patent: Jun. 25, 1985

[54] PRESSURE-RESISTANT PAPER VESSEL

[75] Inventors: Kenji Takasa, Yokohama; Masakatsu Nakamura, Kanagawa, both of Japan

[73] Assignee: Asahi Kasei Kogyo Kabushiki Kaisha, Osaka, Japan

[21] Appl. No.: 522,032

[22] Filed: Aug. 10, 1983

[30] Foreign Application Priority Data

Aug. 13, 1982 [JP] Japan .................. 57-139742
Oct. 15, 1982 [JP] Japan .................. 57-180004

[51] Int. Cl.³ ............................. B65D 5/40
[52] U.S. Cl. ...................... 428/35; 229/3.1; 229/4.5; 229/5.8
[58] Field of Search ............ 428/35; 229/3.1, 4.5, 229/5.8

[56] References Cited

U.S. PATENT DOCUMENTS

| | | | |
|---|---|---|---|
| 3,687,351 | 8/1972 | Kaescher et al. | 229/3.1 |
| 3,949,927 | 4/1976 | Smith | 229/3.1 |
| 3,972,467 | 8/1976 | Whillock et al. | 229/3.1 |
| 3,980,107 | 9/1976 | Barnes | 138/144 |

Primary Examiner—John E. Kittle
Assistant Examiner—James J. Seidleck
Attorney, Agent, or Firm—Birch, Stewart, Kolasch & Birch

[57] ABSTRACT

A pressure-resistant paper vessel having highly improved gas barrier property is provided. The paper vessel has at least one layer having a gas barrier film/paper/gas barrier film laminate structure formed by laminating both the surfaces of paper with a gas barrier plastic film having a carbon dioxide gas permeability of not more than 200. The pressure resistance of the paper vessel at normal temperature is higher than atmospheric pressure but not higher than 10 kg/cm²G.

13 Claims, 52 Drawing Figures

Fig. 12(a)　　　Fig. 12(b)
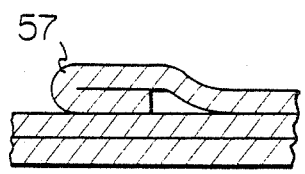 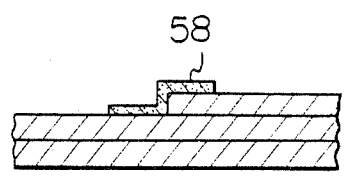
Fig. 13(a)　　　Fig. 13(b)
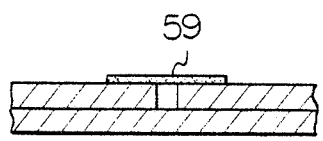 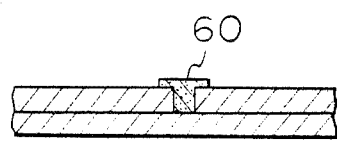
Fig.14(a)　　Fig.14(c)　　Fig.14(e)
　　Fig.14(b)　　Fig.14(d)
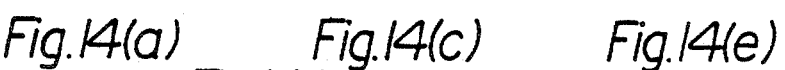
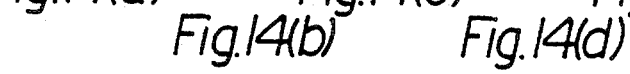
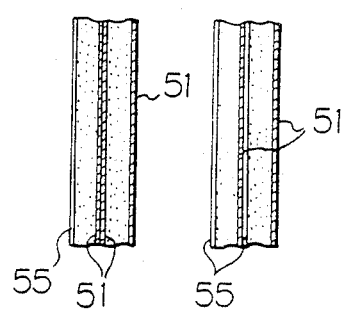

Fig. 32(a)   Fig. 32(b)
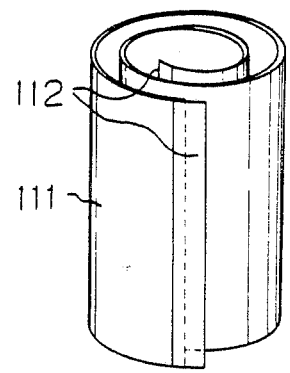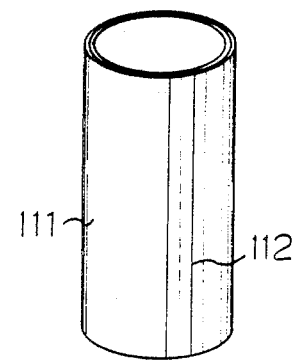
Fig. 33(a)   Fig. 33(b)   Fig. 33(c)
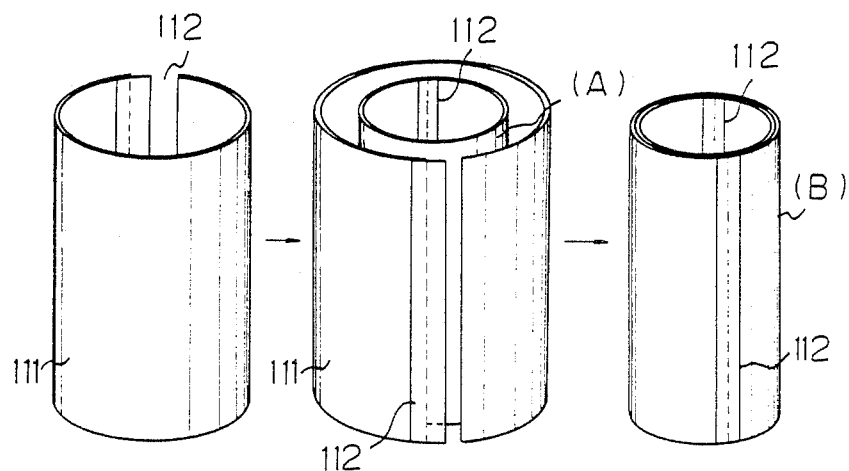

PRESSURE-RESISTANT PAPER VESSEL

BACKGROUND OF THE INVENTION (1) Field of the Invention

This invention relates to a pressure-resistant paper vessel. More particularly, it relates to a pressure-resistant vessel excellent in the adaptability to thermal disposal, which is suitable for containing and storing therein a carbon dioxide gas-containing drink such as beer or carbonated drink and in which the barrel portion and lid members are composed mainly of paper.

(2) Description of the Prior Art

A vessel or container for beer or carbonated drink is different from a vessel for milk or refreshing drink such as juice in the point where the vessel should sufficiently resist the inner pressure produced by carbon dioxide gas and should prevent permeation and escape of carbon dioxide gas. Accordingly, a glass bottle or aluminum can has heretofore been used as the vessel for beer or carbonated drink. From the resource-saving viewpoint, the glass bottle is preferred because it can be collected and used repeatedly. However, since the thickness of glass constituting the bottle is large, the glass bottle is heavy in weight and bulky in size and hence, the transportation cost is large. Moreover, there is a risk of an accident due to explosion at a high temperature in summer or by mishandling. Furthermore, since the glass bottle is used repeatedly, various steps are necessary for washing an empty bottle, checking a washed bottle and treating a washing liquid. Thus, the glass bottle is not satisfactory from the economical viewpoint. Since the mechanical strengths of the metal vessel is much higher than those of the glass vessel, the thickness and weight of the metal vessel can be reduced, and the metal vessel is sufficient in the physical properties such as pressure resistance and gas barrier property. However, there recently arises a problem of disposal of empty cans as a social problem, and the metal vessel as a throwaway vessel should now be reconsidered.

A polyester bottle (PET bottle) formed by blow molding has recently been marketed. This polyester bottle has attracted attention in the art because it has a light weight, is thermally disposable and is excellent in the design property. However, the polyester bottle causes pollution of environment with used bottles as in case of the metal vessel, and it cannot easily been burnt up at an ordinary incineration plant.

Although these conventional vessels such as glass bottles, metal cans and PET bottles involve difficult problems, since there has not been developed a new pressure-resistant vessel capable of solving these problems, these conventional vessels are used even at the present in spite of these problems. Under this background, instead of these conventional pressure-resistant vessels for carbon dioxide gas-containing liquid drinks such as beer and carbonated drink, a vessel composed of paper is eagerly desired because paper is abundant, light in weight and cheap, thermal disposal of the used paper vessel is very easy and the used vessel can be used repeatedly as paper stock. However, paper has various problems. For example, the physical properties become deteriorated on absorption of the moisture, the gas permeability is very high, and it is very difficult to form paper into a shape having a three-dimensional curved surface, though this is relatively easy in case of glass, metals and plastics. Because of these defects, development of pressure-resistant paper vessels have been hindered.

As means for imparting a water-proof property to paper, there have ordinarily been adopted a wax-coating method and a polyethylene film-laminating method. Most of milk vessels of paper now marketed in large quantities are manufactured by using polyethylene film-laminated paper.

In case of vessels for liquids such as sake, wine and soy source, not only the water-proof property but also the gas barrier property is required, and only the water-proof treatment is insufficient but the gas barrier property should further be given to paper. As means for imparting a gas barrier property, an aluminum foil is ordinarily used, and a vessel composed of aluminum foil-laminated paper is marketed in considerable quantities as the vessel for sake or the like. A wall of this paper vessel ordinarily has a very complicated structure of polyethylene/paper/polyethylene/adhesive/aluminum foil/adhesive/polyethylene.

Conventional paper vessels for milk, sake, fruit juice and the like are box-shaped vessels in which each of the barrel portion, bottom face portion and the top face portion is flat. If beer or carbonated drink is filled and stored in such a box-shaped vessel, the flat portion is liable to be deformed into a bulgy shape by the inner pressure and a large deformation is caused on the ridgeline of the bent part, resulting in breakage or leakage of gas and destruction of the functions of the vessel. The pressure resistance required for a pressure-resistant vessel for a carbon dioxide gas-containing liquid such as beer or carbonated drink is considerably high. For example, beer has an inner pressure of 2 to 2.5 $kg/cm^2G$ at normal temperature or 4 to 5 $kg/cm^2G$ at 50° C., and carbonated drink has an inner pressure of 3 to 3.5 $kg/cm^2G$ at normal temperature or 5 to 6 $kg/cm^2G$ at 50° C. Accordingly, in order to impart a sufficient pressure resistance to the vessel, it is necessary that the majority of the portion falling in contact with a compressed fluid should be formed to have a curved surface so that the internal stress is uniformalized over the entire wall of the vessel. In fact, all of the conventional pressure-resistant vessels such as glass bottles, metal cans and PET bottles are formed to have such a shape as satisfying this requirement. Also in a paper vessel, this point should be sufficiently taken into consideration. Namely, from the viewpoint of the mechanical strengths, particularly, the pressure resistance, it is preferred that the barrel portion should have a cylindrical shape and the lid portion should have a spherical curved shape.

In order to obtain a satisfactory pressure-resistant vessel, the following three problems should simultaneously be solved: namely, how to impart a water-proof property, how to prevent permeation of gas and how to impart a strength sufficient to resist the inner pressure. However, it is very difficult to simultaneously solve these problems, and therefore, a pressure-resistant vessel composed entirely of paper has not been marketed.

As pointed out hereinbefore, as means for imparting a water-proof property and a gas barrier property to paper, there is ordinarily adopted a method in which an aluminum foil considered to have a highest reliability as the gas barrier layer is laminated on paper. The permeation speed of gases such as oxygen, water vapor and carbon dioxide gas through the aluminum foil is substantially zero and the aluminum foil is excellent as the gas barrier material over conventional gas barrier plastic films. Namely, a most excellent gas barrier plastic film now marketed has an oxygen permeability 2 to 50 cc-mil/m$^2$·24 hours·atm and a carbon dioxide gas permeability of 5 to 200 cc-mil/m$^2$·24 hours·atm at normal temperature.

It has been found that serious problems as described below arise when an aluminum foil is applied to a pressure-resistant paper vessel. In the first place, as pointed out hereinbefore, in order for a pressure-resistant vessel to resist the inner pressure, it is preferred that the majority of portions falling in contact with a compressed fluid should have a curved surface, for example, a three-dimensional curved surface. However, it is difficlt to laminate an aluminum foil to a lid member having such a curved surface. Furthermore, an additional step of shaping the aluminum foil in advance according to the shape of the lid member is necessary. In the second place, in an aluminum foil-laminated paper vessel, the aluminum foil cannot follow a slight deformation caused by the inner pressure and breakage of the aluminum foil takes place, with the result that leakage of gas is often caused at the stage of small deformation before appearance of breakage due to a large deformation of the paper layer. In the third place, although the aluminum foil has an excellent gas barrier property, if the thickness of the aluminum foil is as small as 7 to 10 μm, pinholes are formed and such a thin aluminum foil cannot be an excellent gas barrier material. It is said that according to the present technique, it is impossible to reduce the thickness of the aluminum foil below 30 μm without formation of pinholes. Incidentally, use of an aluminum foil having such a large thickness results in increase of the price of the vessel. Accordingly, at the present, an aluminum foil having a thickness of 5 to 10 μm is used with a risk of formation of pinholes, and from the practical viewpoint, the reliability of this aluminum foil concerning the gas barrier property cannot be regarded as being complete.

As is apparent from the foregoing description, an aluminum foil is insufficient in various points as a gas barrier material for a pressure-resistant paper vessel. Accordingly, development of an excellent gas barrier material capable of being used as a substitute for the aluminum foil is eagerly desired. This gas barrier material should have a tensile elongation higher than that of an aluminum foil, should be excellent in the processability, should not cause environmental pollution and should easily be laminated on paper.

A gas barrier plastic film is considerably inferior to the aluminum foil in the gas barrier property, and therefore, the thickness of the film should considerably be increased, resulting in increase of the price of the vessel.

An example of a multi-ply packaging material comprising a gas barrier plastic film is disclosed in Japanese Patent Publication No. 56-40032 (1981). In this patent reference, it is taught that in a multi-ply packaging material comprising a plurality of gas barrier plastic film layers, if these layers are bonded together only through the peripheral edge portions thereof, the gas barrier characteristics are unexpectedly increased over the gas barrier characteristics of a single-ply layer of the same material having a thickness corresponding to the total thickness of the two film layers. From the data shown in working examples of this patent reference, it is seen that the oxygen or carbon dioxide gas permeability of a two-ply packaging material is reduced to $\frac{1}{2}$ to $\frac{1}{3}$ of the oxygen or carbon dioxide gas permeability of a single-ply packaging material having a thickness corresponding to the total thickness of the respective layers of the two-ply packaging material. The reasons for this phenomenon given in the Japanese reference are as follows. Namely, in the first place, in a multi-ply material having a certain total thickness of the respective layers, the time required for attaining a stable state of the permeation of gas is much longer than the time required for attaining this stable state in a single-ply material having a thickness corresponding to said total thickness. In the second place, this stable state of the permeation of gas is more readily disturbed by the adoption of the multi-ply structure. Namely, the pressure of gas which has passed through the first layer is reduced, and this reduction of the pressure results in substantial reduction of the capacity of permeating through the second or subsequent layer.

Ordinarily, it is understood that when a plastic film is exposed to a certain gas, the gas is first dissolved in the plastic film and the gas permeability is gradually increased from an initial small value to a substantially fixed value attained when the gas is dissolved in the film to the saturation point. The gas permeability at this stable equilibrium state is ordinarily accepted as the gas permeability of the plastic film.

We noted the above-mentioned phenomenon shown in Japanese Patent Publication No. 56-40032, especially the change of the permeability with the lapse of time during the period required for attaining the stable state of the permeation of gas (hereinafter referred to as "transition period"), and we made various experiments by using carbon dioxide gas and arrived at the following conclusions.

(1) In case of the multi-ply structure disclosed in the above-mentioned patent reference, the time required for attaining the stable state of the permeation of gas is much longer than in case of a single-ply structure of the same material having the same thickness. This time varies depending upon the kind and thickness of the gas barrier material and the measurement conditions (temperature and humidity).

(2) At the initial stage of the transition period, an apparently considerably low value is obtained by the measurement, and, when the comparison is made based on customarily mentioned gas permeabilities, the measurement should be performed after the stable state has sufficiently been attained.

(3) In the above-mentioned patent reference, it is taught that the gas permeability after attainment of the stable state in case of the two-ply structure is reduced to $\frac{1}{2}$ to $\frac{1}{3}$ of the gas permeability of the single-ply structure having the same thickness. However, from the results of the experiments made by us, it was confirmed that the gas permeability of the two-ply structure after attainment of the stable state is reduced only to about 80 to about 90% of the single-ply structure. It is construed that in the above patent reference, the conclusion was hasty drawn without the time required for attaining the stable permeation state being sufficiently taken into consideration.

In case of a vessel for beer or carbonated drink, it is said that it is sufficient if the quality-guaranteeing period or required shelf life is about 6 months. Accordingly, even when the gas permeability after attainment of the stable permeation state is high, if the time required for attaining the stable permeation state, that is, the transition period, is long, the material is very significant from the practical viewpoint. The multi-ply structure disclosed in Japanese Patent Publication No.

56-40032 is practically significant in the point where this transition period is prolonged. However, it was found that this transition period of the multi-ply structure disclosed in the above patent reference is still insufficient in view of the fact that the shelf life of a vessel for beer or carbonated drink is regarded as 6 months, and therefore, this multi-ply structure is not practically adopted for a vessel for beer or carbonated drink. Moreover, it was found that the gas permeability of the multi-ply structure after attainment of the stable permeation state is reduced only to 80 to 90% of the gas permeability of the single-ply structure and because of the low carbon dioxide gas barrier property, it is not permissible to apply the above-mentioned multi-ply structure to construction of a vessel for beer or carbonated drink.

Accordingly, we made research with a view to developing a layer structure having a much prolonged transition period and having a much improved gas barrier property after attainment of the stable gas permeation state. We first examined influences of a space between adjacent films in a multi-ply structure, and as the result, it was found that the presence of a very thin air layer greatly prolongs the transition period and if the thickness of this air layer is increased, the transition period is further increased and a much longer time is necessary for attaining the stable permeation state. In the multi-ply structure disclosed in the above-mentioned patent reference, the peripheral edge portions of the films are bonded together and in other portions, the films are merely piled and contacted with each other, and the thickness or function of the air layer present between the films is not mentioned at all.

The reasons why increase of the air or space layer between gas barrier films results in prolongation of the transition period are considered to be as follows. A gas which has passed through a first film is diluted in a space layer as described above and the ability of the gas to permeate through a subsequent film is reduced, and therefore, the gas permeability is controlled to a low level until the concentration of the gas in the space layer is increased to an equilibrium level. Accordingly, the larger is this space layer, the longer becomes the transition period. However, it was found that if only the space layer is increased in volume, though the transition period is prolonged, the level of the gas barrier property after attainment of the stable gas permeation state is substantially equal to that of the above-mentioned multi-ply structure.

SUMMARY OF THE INVENTION

It now has been found to our great surprise that if a paper layer is formed instead of the above-mentioned space or air layer to form a laminated paper having a structure of gas barrier film/paper/gas barrier film, the transition period of the carbon dioxide gas permeability of this structure is drastically prolonged as compared with that of the multi-ply structure disclosed in the above-mentioned patent reference or the gas barrier plastic film/space layer/gas barrier plastic film structure comprising a space layer having the same thickness as that of the paper layer in the above-mentioned structure, and the gas barrier property after attainment of the stable permeation state is highly improved in this laminated paper.

It is therefore a primary object of the present invention to provide a pressure-resistant paper vessel wherein the carbon dioxide gas barrier property is highly improved without increase of the thickness of a gas barrier plastic film.

More specifically, in accordance with the present invention, there is provided a pressure-resistant paper vessel which comprises at least one laminated layer structure of gas barrier film/paper/gas barrier film formed by laminating both the surfaces of paper with a gas barrier plastic film having a carbon dioxide gas permeability of not more than 200, said paper vessel having a pressure resistance at normal temperature higher than atmospheric pressure but not higher than 10 $kg/cm^2G$.

BRIEF DESCRIPTION OF THE DRAWINGS

FIG. 11-(b) is a sectional view showing the barrel portion of a pressure-resistant vessel as shown in FIG. 11-(a), in which both the end edges are pile-bonded;

FIGS. 12-(a) and 12-(b) are sectional views showing the treatment state of the end edges of a laminated paper;

FIGS. 13-(a) and 13-(b) are sectional views showing the treatment state of the end edges of a laminated paper at the butt bonding thereof;

FIGS. 14-(a) through 14-(e) are sectional views showing layer structures for the barrel portion of the pressure-resistant vessel;

FIGS. 32-(a) and 32-(b) are perspective views showing the process for forming a two-ply wall barrel portion of the pressure-resistant vessel;

FIGS. 33-(a), 33-(b) and 33-(c) are perspective views showing the process for forming another example of the two-ply wall barrel portion of the pressure-resistant vessel.

DETAILED DESCRIPTION OF THE INVENTION

Figure 1A:
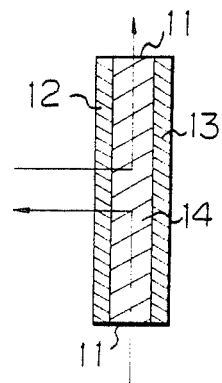
FIGS. 1-(a) and 1-(b) are sectional views illustrating the gas permeability of a laminated structure of gas barrier film/paper/gas barrier film.

The gas barrier characteristics of a plastic film laminate differ according to the kind and thickness of the gas barrier material, the thickness of the space layer, the thickness of paper and the measurement conditions. For example, when the carbon dioxide gas barrier characteristics of a two-ply structure of gas barrier film/gas barrier film, which structure is described in Japanese Patent Publication No. 56-40032, a laminate structure of gas barrier film/space layer/gas barrier film and a laminate structure of gas barrier film/paper/gas barrier film, in each of which the gas barrier film is a known polyacrylonitrile film ("Barex 210" supplied by Vistron Co., U.S.) having a thickness of 50 $\mu$m and the thickness of each of the paper and the space layer between the film layers, are measured at a temperature of 50° C. and a relative humidity of 0%, results as shown in Table 1 are obtained.

Incidentally, in Table 1, the transition period is expressed by the number of days required for the permeability to be increased to 90% of the permeability after attainment of the stable permeation state.

TABLE 1

| Layer Structure | Transition Period (days) | Permeability (cc/m$^2$ · 24 hrs · atm) in Stable Permeation State |
| --- | --- | --- |
| Barex/Barex | 10 | 13.4 |
| Barex/space layer/Barex | 20 | 12.8 |
| Barex/paper/Barex | 40 | 8.8 |

At the measurement of the gas barrier characteristics of the gas barrier plastic film/paper/gas barrier plastic film structure and the gas barrier plastic film/space layer/gas barrier platic film structure, a spacer which is composed of the same material as of the gas barrier plastic film and has the same thickness as that of the space layer or paper is disposed in the peripheral edge portion of each laminate so that the peripheral edge portion is completely sealed up.

It is quite surprising that such excellent effects are attained by sandwiching paper with gas barrier plastic films. The mechanism for attaining such excellent effects has not been elucidated, but it has been found that such excellent effects are not due to adsorption of carbon dioxide gas by the intervening paper and it is presumed that a certain specific laminar sublayer effect will probably be attained in the interface between the gas barrier film and paper.

The following effects and advantages are attained by using laminated paper having a gas barrier plastic film/paper/gas barrier plastic film structure.

(1) The time required for attaining the stable state of the gas permeation is greatly prolonged and the gas permeability after attainment of the stable permeation state is much lower than that of the single-ply structure of the gas barrier plastic film having a thickness corresponding to the total thickness of the gas barrier plastic films in the laminated paper. Accordingly, when this laminated paper is used for the production of a vessel for beer or carbonated drink, the requirement of the quality-guaranteeing term or shelf life for vessels of this type is fully satisfied.

(2) As pointed out hereinbefore, in the gas barrier film/space layer/gas barrier film structure, an effect of prolonging the transition period can be attained and this structure is substantially satisfactory in the gas barrier characteristics. However, in a practical vessel, it is substantially impossible to maintain the space layer, and hence, this structure is poor in the practical utility. In contrast, in the structure of the present invention, since it includes a paper layer, because of the rigidity of paper, a good shapeability is obtained.

(3) Since an aluminum foil is not used, the vessel of the present invention having the above-mentioned laminate structure can easily been burnt up, and there is no risk of reduction of the gas barrier property due to formation of pinholes or to breakage by deformation caused at the processing step or by the inner pressure. Therefore, the reliability of the vessel concerning the gas barrier property is increased. If an appropriate gas barrier film is chosen and used, a laminate structure having gas barrier characteristics comparable or superior to those of an aluminum foil-laminated paper can be provided.

(4) Since the basic structure is a three-ply structure of gas barrier film/paper/gas barrier film, the number of laminating steps can be reduced as compared with the number of laminating steps required for production of the aluminum foil-laminated paper, and the loss of the material generated at the laminating steps is decreased. Therefore, the structure of the present invention is very advantageous from the economical viewpoint.

(5) Since gas barrier plastic films are laminated on both the surfaces of paper, the rigidity is higher than that of a laminated paper having one surface laminated with a gas barrier plastic film.

In the pressure-resistant paper vessel of the present invention comprising a laminated paper having the above-mentioned gas barrier plastic film/paper/gas barrier plastic film structure and having a pressure resistance at normal temperature of from atmospheric pressure to 10 kg/cm$^2$G, the gas barrier plastic film used should have a carbon dioxide gas permeability of not more than 200.

By the term "carbon dioxide gas permeability" referred to in the instant specification and appended claims is meant the amount (cc) of carbon dioxide gas which permeates through an area of 1 m$^2$ of a sample at a temperature of 23° C. and a relative humidity of 0% under 1 atmosphere over a period of 24 hours after attainment of the stable permeation state. Accordingly, the unit of the permeability is cc/m$^2$·24 hrs·atm.

In the laminated paper having the gas barrier plastic film/paper/gas barrier plastic film structure, the gas barrier effect (hereinafter referred to as "two-barrier-layer effect") varies depending upon the gas barrier property of the gas barrier plastic film, and this effect is prominent as the film has a higher gas barrier property. Even if the carbon dioxide gas permeability of the plastic film is higher than 200, the two-barrier-layer effect can be attained but this effect is lower than the effect attainable by a plastic film having a carbon dioxide permeability of not more than 200, and since the absolute level of the gas barrier property of the above film is low, the requirement of the gas barrier property for a vessel for beer or carbonated drink is not satisfied.

Since the intended effect of the present invention is more prominent as the carbon dioxide gas permeability of the plastic film is lower, the lower limit of the carbon dioxide gas permeability is not particularly critical. Namely, all of plastic films known as carbon dioxide gas barrier plastic films can be used. In the case where the present invention is applied to a vessel for beer or carbonated drink, if the carbon dioxide gas permeability is approximately 0.1, the severest barrier property required for the vessel, presumed from the required storage period of the content or the required shelf life, is attained. In view of the foregoing, it is ordinarily preferred that the carbon dioxide gas permeability of the gas barrier plastic film used in the present invention be in the range of from 0.1 to 200 cc/m$^2$·24 hrs·atm, though a lower carbon dioxide gas permeability is required when a much higher gas barrier property is desired.

Most of films ordinarily known as gas barrier plastic films can be used as the gas barrier film of the present invention. The kind of the film is not particularly critical. Even in case of a film inferior in the gas barrier property, by increasing the thickness, the carbon dioxide gas permeability can be controlled to a value of not more than 200. However, increase of the gas barrier property by increasing the film thickness is economically disadvantageous. Therefore, use of a plastic film excellent in the gas barrier property is preferred. More specifically, a film having a carbon dioxide gas permeability of not more than 400 per mil of the thickness of the film is preferred. As preferred examples, there can be mentioned films of polyvinylidene chloride, a vinylidene chloride/vinyl chloride copolymer, a polyamide such as nylon, a polyester, polyvinyl alcohol, a saponified ethylene/vinyl acetate copolymer marketed under the tradename of "Eval" (supplied by Kuraray Co.), cellophane, a polyacrylonitrile resin called "PAN", and nitrile resins marketed under the tradename of "Barex" (supplied by Vistron Co.) and the tradename of "Lopac" (supplied by Monsanto Co.).

The plastic film may have a single-layer structure or a laminate structure including at least two layers. Furthermore, a film comprising a gas barrier film and a non-barrier film laminated on one or both of the surfaces thereof may be used. As an example of the laminate film of this type, there can be mentioned a polyethylene/polyvinylidene chloride/polyethylene laminate film marketed under the tradename of "Barrialon" (supplied by Asahi Kasei K.K.). In this laminate film, polyethylene promotes the heat sealability and has no significant influence on the gas permeability. Moreover, a film having both the surfaces coated with a gas barrier material may be used. As examples of the film of this type, there can be mentioned polyvinylidene chloride resin-coated films called "Saran-Coated Film" or "K-coated Film". If desired, these films may be vacuum-deposited with aluminum on the surface thereof. The amount of this vacuum-deposited aluminum layer is much smaller than the amount of an aluminum foil. Accordingly, the film of this type is economically advantageous over the aluminum foil-laminated structure and also advantageous from the viewpoint of the adaptability to incineration. Furthermore, a film having the surface subjected to the moisture-proof treatment, for example, a moisture barrier cellophane film may be used.

In case of a material having OH groups, such as polyvinyl alcohol, a saponified ethylene/vinyl acetate copolymer or cellophane, there is a risk of reduction of the gas barrier property under high humidity conditions. Accordingly, in the case where a film of this material is used, it is preferred that the surface of the film be laminated with a polyethylene film or subjected to other moisture-proof treatment.

In the present invention, the thickness of the carbon dioxide gas barrier film is appropriately selected according to the barrier property of the film, but in view of the price and the handling easiness, a smaller thickness is preferred and it is ordinarily preferred that the thickness of the film be 10 to 200 μm.

The kind of paper to be used in the present invention is not particularly critical, and all the papers customarily used for paper vessels can be used in the present invention. For example, there may be used bleached kraft paper and unbleached kraft paper. In case of a vessel for beer or carbonated drink, in order to resist the inner pressure, it is required that paper excellent in mechanical properties such as tensile strength, tensile modulus and rigidity should be used. Accordingly, use of paper formed from a pulp of the soft wood type having a long fiber length is preferred.

By the term "paper" used in the instant specification and appended claims is meant a thin and opaque sheet composed mainly of plant pulp fibers in which fibers are bonded together by entanglement among fibers or by adhesion. In the present invention, a product formed from a mixture of plastic fibers or the like with plant pulp fibers may also be used, so far as the product is substantially regarded as paper.

It is sufficient if the pressure resistance required for a pressure-resistant paper vessel for beer or carbonated drink is 10 kg/cm²G at highest at normal temperature, even when the safety factor is taken into consideration. Accordingly, the present invention is not applied to a vessel required to have a pressure resistance exceeding 10 kg/cm²G at normal temperature. In contrast, the present invention can be applied to all the vessels where the required pressure resistance is 10 kg/cm²G or lower, and the present invention can be applied even to a vessel having a slight inner pressure, for example, a vessel for low carbonated drink. Namely, the pressure resistance of the vessel to which the present invention is applied is in the range of from atmosphere pressure to 10 kg/cm²G at normal temperature.

Figure 1B:
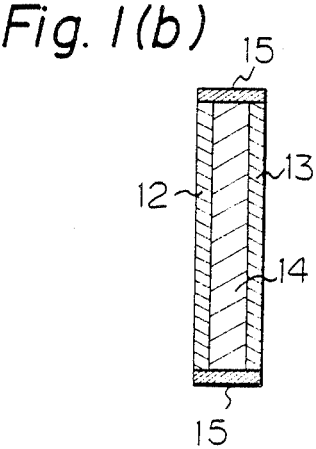

When a pressure-resistant paper vessel is formed from a laminated paper having a structure of gas barrier film/paper/gas barrier film, in some vessel shape, as shown in FIG. 1-(a), the cut part 11 is directly exposed to the outer atmosphere and hence, there is a risk of reduction of the gas barrier property of the vessel as a whole because of permeation of a part of gas on the inner or outer side of the vessel through this cut part 11. Incidentally, in FIG. 1, each of reference numerals 12 and 13 represents a gas barrier film, and reference numeral 14 represents paper. The above-mentioned risk can be eliminated if the cut part 11 is coated with an appropriate gas barrier material 15, as shown in FIG. 1-(b). The coating material may be the same as or different from the material of the gas barrier film laminated on the paper. This coating operation may be conducted at an appropriate time, for example, after lamination of the gas barrier films on the paper, at the time of cutting a vessel base or after assembling of the vessel.

Figure 2:
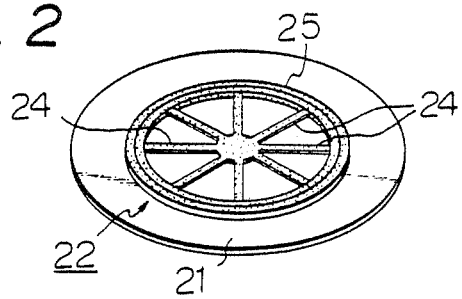
FIG. 2 is a perspective view showing an example of a lid member.
Figure 3:
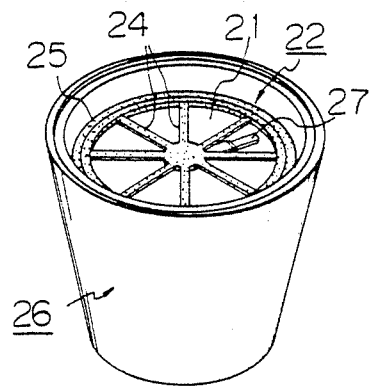
FIG. 3 is a perspective view showing a vessel to which the lid member shown in FIG. 2 is attached.

Since a vessel for beer or carbonated drink is required to have a considerably high pressure resistance, high pressure-resistant characteristics are required for this vessel. In ordinary pressure-resistant vessel, in order to attain a sufficient pressure resistance, it is necessary that the stress generated by the inner pressure should be uniformalized, and therefore, a curved shape is adopted for the majority of parts falling in contact with a compressed fluid. However, as pointed out hereinbefore, paper is defective as compared with glass, metals or plastics in that paper cannot be molded to have a three-dimensional curved shape. Therefore, a plane structure has inevitably been adopted in case of a paper vessel and certain reinforcing means has been adopted so as to impart a pressure resistance to the paper vessel. For example, Japanese Unexamined Utility Model Publication No. 57-46415 (1982) proposes a pressure-resistant paper vessel constructed by attaching lid members to upper and lower openings of a paper cup formed by winding barrel paper two times and bonding it through the entire surface. As shown in FIGS. 2 and 3, the lid member 22 used for this paper vessel has a structure in which radial notches extending from the center to the periphery are formed in a paper disc 21 and a synthetic resin is cast in these notches and in both the front and back surfaces of the disc 21 at the position connecting the top ends of the notches to form resin beams 24 and a ring frame 25. In this paper vessel, the lid member 22 having a plane structure is weakest against the stress by the inner pressure, and therefore, the above-mentioned resin beams 24 and ring frame 25 are formed to impart a pressure resistance to the lid member.

It now has been found that in the lid member 22 having a plane structure, the local stress due to the inner pressure is large and the stress acting on the peripheral portion of the lid member 22 is especially large and therefore, even if the reinforcing effect is produced by the ring frame 25, the lid member 22 is greatly deformed by the inner pressure to cause various practical troubles. If the thickness of the paper disc 21 is increased or the amount of the synthetic resin used for formation of the beams 24 and ring frame 25 is increased so as to avoid occurrence of the above undesirable phenomenon, the cost of the starting material is increased, resulting in economical disadvantages. Moreover, in this paper vessel, the air tightness in the bonded portion between the barrel 26 and lid member 22 is insufficient. In the paper vessel 21 shown in FIG. 2, the portion of the lid member 22 located on the outer side of the ring frame 25 is bent to form a skirt and the lid member 22 is bonded to the barrel 26 through this skirt. However, many wrinkles are formed on the skirt when the skirt is formed. Accordingly, when the lid member 22 is bonded to the barrel 26, because of these wrinkles, it is difficult to maintain a good air tightness in the bonded portion.

The following two requirements should be satisfied for a pressure-resistant paper vessel. (1) In order to uniformalize the stress generated by the inner pressure, the majority of portions falling in contact with a pressurized fluid should have a curved shape. (2). In order to maintain air tightness in joint portions to be bonded, formation of wrinkles should be avoided.

Figure 4:
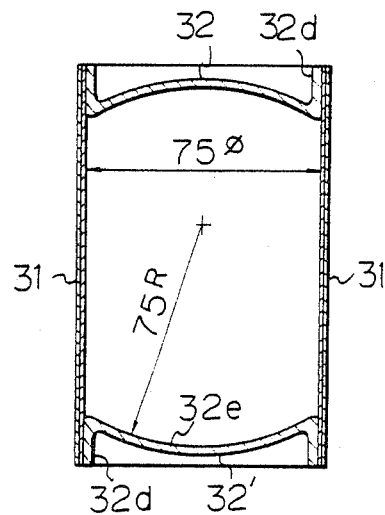
FIG. 4 is a sectional view showing an example of a pressure-resistant vessel.

As a structure satisfying the requirement (1), there may be considered a structure shown in FIG. 4, in which lid members 32 and 32' having a skirt 32d to be fitted in the cylindrical barrel 31 in parallel thereto and a thin curved face 32e are tightly secured to the upper and lower ends of the cylindrical barrel 31 through the peripheral faces of the skirts 32d.

It has been found that it is preferable to adopt a technique of forming a lid directly from pulp instead of a paper board.

A pulp molding method is ordinarily known as means for obtaining a molded article from a pulp. According to this pulp molding method, a pulp is dispersed in water and the thus-obtained aqueous slurry is subjected to the molding operation. Accordingly, the step of dehydrating or drying a molded article is indispensable, and large equipment is necessary for adjusting the concentration of the pulp slurry and feeding and discharging the pulp slurry. Since the pressing operation is not performed, a molded article obtained according to this pulp molding method has ordinarily a large thickness and the surface is not smooth. As means for eliminating this disadvantage, there has been proposed a method in which the obtained molded article is hot-pressed. However, this method is troublesome and the manufacturing cost is high. Accordingly, we tried to make a lid from a non-woven fabric mat obtained according to the dry method, without adopting the wet pulp molding method. In this case, if a lid is made from a non-woven fabric mat composed solely of pulp fibers, since the bonding among the pulp fibers is weak, the lid is inferior in the strength and cannot be used as a lid member for a pressure-resistant vessel. It has been found that when a non-woven fabric mat is formed from mixed pulp comprising plant pulp fibers and fibers of a synthetic pulp according to the dry method, the mat is inserted in a mold and then hot-pressed and the surface of the molded article is covered with a thermoplastic resin layer, a lid member having a sufficient strength as required for a pressure-resistant vessel is obtained. By the term "synthetic pulp" is meant a thermoplastic resin in the form of a fiber. As the thermoplastic resin, there can be mentioned polyethylene, polypropylene, polystyrene, a polystyrene/polyethylene blend and a polystyrene/acrylonitrile-styrene copolymer blend. A non-woven fabric mat prepared according to the dry method is characteristic over a paper board or the like in that the bonding among fibers is weak and the fibers easily slip. Therefore, when this mat is hot-pressed, even if there is a deep-draw portion such as a skirt portion, the mat is easily deformed along the form of the pressing mold, tearing or formation of wrinkles, as observed in case of a paper board or the like, is not caused at all. Moreover, when this mat is molded by hot pressing, the synthetic pulp is melted to adhere to the vegetable pulp fibers, and as the result, a molded article being excellent in the mechanical properties such as tensile strength and rigidity can be obtained.

Figure 5:
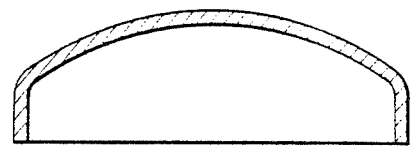
FIGS. 5 and 6 are sectional views illustrating examples of a bottom lid of the pressure-resistant vessel.
Figure 6:
Figure 7:
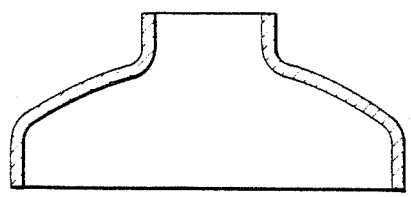
FIG. 7 is a sectional view showing an example of a top lid of the pressure-resistant vessel.
Figure 8:
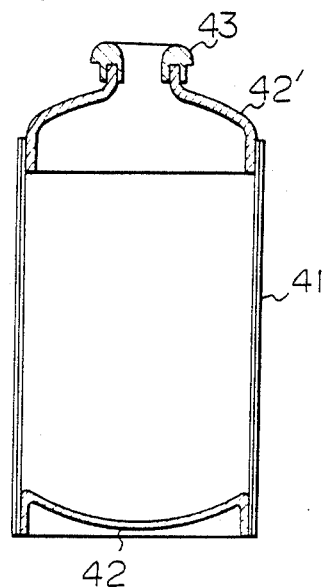
FIG. 8 is a sectional view illustrating an example of a pressure-resistant vessel having a cap attached to an opening thereof.

Since the lid member of the present invention is applied to a vessel for beer or carbonated drink, it comprises a top lid and a bottom lid. The shape of the bottom lid is not particularly critical, so far as it has a spherical curved surface effective for uniformalizing the stress generated by the inner pressure and a skirt portion to be bonded to the barrel. The top lid should have an opening for charging and discharging the content, in addition to the above-mentioned curved surface and skirt. For example, sectional shapes as shown in FIGS. 5 and 6 may be adopted for the bottom lid. The shape or structure of the opening of the top lid is not particularly critical in the present invention. For example, a top lid having a shape shown in FIG. 7 is molded and a cap 43 of a plastic material or metal is attached to the opening of the top lid 42' to form a vessel as shown in FIG. 8.

The shape of the lid molded according to the above-mentioned method can be changed depending on the shape of the barrel to which the lid is secured. For example, according to the kind or inner pressure of a carbon dioxide gas-containing liquid to be filled, a barrel having a square or rectangular shape having a large radius of curvature at each of the four corners may be used, and in this case, the shape of the lid is determined so that the lid is tightly secured to the barrel having the above-mentioned shape. In order to prevent concentration of the stress, it is ordinarily preferred that the majority of the portion falling in contact with a pressurized fluid should have a curved surface and should not include an angular part.

The kind of the pulp to be incorporated in a non-woven fabric mat for the production of a molded article having excellent physical properties as described above is not particularly critical. However, in order to increase the strength of the molded article, it is preferred that a pulp having a relatively long fiber length, such as a bleached kraft pulp of soft wood, be used.

The ratio of the synthetic pulp to be mixed with such a wood pulp for production of the non-woven fabric mat is determined according to the kind and moldability of the synthetic pulp and the mechanical strength required for the molded article. Especially, the moldability for imparting a curved surface to the compressed fluid-contacting portion of the lid and forming a skirt to be bonded to the barrel in the peripheral portion of the lid and the mechanical strengths sufficient to resist the pressure of carbon dioxide gas are especially important. If the mixing ratio of the synthetic pulp is lower than 10% by weight, the bonding among pulp fibers is reduced and the mechanical strengths of the molded article are insufficient, and the moldability of the mixed pulp fibers is poor and there is a risk of tearing or wrinkling in a portion having a large draw ratio, such as the skirt portion. On the other hand, if the mixing ratio of the synthetic pulp exceeds 50% by weight, the moldability is increased but an excellent property of paper, that is, a high rigidity, is lost. Moreover, in view of the intended effect of providing a pressure-resistant vessel composed mainly of paper, it is preferred that the amount of the synthetic pulp be reduced. Accordingly, in the present invention, it is preferred that the mixing ratio of the synthetic pulp to the pulp mixture be in the range of from 10 to 50% by weight, especially 20 to 40% by weight.

Namely, in the present invention, the lid to be secured to the barrel of the pressure-resistant vessel, in which the majority of the compressed fluid-contacting portion has a curved surface, is prepared from a non-woven fabric mat obtained from a pulp mixture containing 10 to 50% by weight of a synthetic pulp according to the dry method.

Figure 9A:
FIGS. 9-(a) and 9-(b) are sectional views illustrating the process for forming a lid.
Figure 9B:

Several processes for the productions of non-woven fabric mats according to the dry method are known [see Japanese Unexamined Patent Publications No. 48-36463 (1973) and No. 48-72474 (1973)]. Any of these known processes may be adopted in the present invention. For example, there may be adopted a process in which a certain amount of a synthetic pulp is added to a vegetable pulp, the pulps are mixed and disintegrated in a dry state by using a disintegrator such as a refiner, the resulting mixed fibers are suspended in air and they are then scattered on a formation wire provided with a suction box to form a mat-like sheet. The thus-obtained non-woven fabric mat is supplied to a hot press and compressed under heating to obtain a lid member in which the majority of a portion falling in contact with a compressed fluid has a curved surface. At this molding step, the pressing temperature and pressure are appropriately determined according to the kind of the synthetic pulp and the mechanical properties required for the molded article. For example, when a synthetic pulp of the polyethylene type is used, the molding operation is carried out at a pressing temperature of 120° to 200° C. under a pressing pressure of 5 to 100 kg/cm². In case of a lid having a skirt portion having a large draw angle as shown in FIG. 4, it is preferred that the press molding be carried out in such a manner that the non-woven fabric mat is first molded as shown in FIG. 9-(a) and is then molded as shown in FIG. 9-(b).

In molding the lid for the pressure-resistant vessel of the present invention, the design of the shape and thickness of the lid is important. Namely, the shape and thickness should be determined while the mechanical properties, especially the tensile strength, of the product obtained by heating and pressing the non-woven fabric mat are taken into consideration. In case of a pressure-resistant vessel having a shape and size as shown in FIG. 4, according to the equation of a thin spherical shell, the following relation is established between the stress and inner pressure:

$$P = \frac{2\sigma t}{r}$$

wherein P stands for inner pressure (kg/cm²G), σ stands for the stress (kg/cm²), r stands for the curvature radius (cm) of the lid, and t stands for the thickness (cm) of the lid.

In this vessel, since the tensile stress acts mainly as the stress, the tensile strength at break of the molded article obtained by heating and pressing the non-woven fabric mat is used as the stress $\sigma$. Assuming that this value is 250 kg/cm² and the inner pressure of the pressure-resistant vessel is 8.0 kg/cm²G, the thickness t of the pressure-resistant vessel should be at least 0.12 cm, as is seen from the following calculation based on the above equation:

$$t = \frac{Pr}{2\sigma} = \frac{8.0 \times 7.5}{2 \times 250} = 0.12 \text{ (cm)}$$

The above calculation is only an example, and actually, when the lid is used for the pressure-resistant vessel, the curvature of the lid is increased by the inner pressure or the joint portion between the barrel and the lid does not accord with the above calculation. Accordingly, the safety factor should naturally be taken into consideration. If the thickness of the molded sheet is smaller than the desired thickness, there may be adopted a method in which a plurality of mats are piled and then press-molded.

When the lid of the present invention is applied to a vessel for beer or carbonated drink, since the required pressure resistance varies depending upon the kind of the content, the thickness of the lid should appropriately be determined case by case. If the thickness is increased, the pressure resistance is increased, but molding of a lid having an unnecessarily large thickness is difficult and economically disadvantageous. Even if the safety factor is taken into consideration, a pressure resistance is 10 kg/cm²G at highest at normal temperature is sufficient for a pressure-resistant vessel of this type. In view of the foregoing, it is ordinarily preferred that the thickness of paper in each of the top lid and the bottom lid in the vessel of the present invention be in the range of from 0.3 to 3 mm.

The so-obtained lid is excellent in the strength characteristics, but in the case where it is used for a vessel for a carbon dioxide gas-containing liquid the lid is insufficient in the water proofness and carbon dioxide gas barrier property. Accordingly, it is important that at least a surface falling in contact with a compressed fluid, that is, a carbon dioxide gas-containing liquid, should be covered with a gas barrier plastic film. As means for covering the lid with the plastic film, there can be mentioned a method in which a lid-shaped molded article is prepared according to the above-mentioned method, a plastic film is inserted in the mold used for formation of the lid-shaped molded article and the molded article is heat-pressed again. In the case where the plastic film has a heat fusion-bondability to the plant pulp or synthetic pulp of the molded article, this method is advantageous because covering is completed only by heat-pressing. Accordingly, it is preferred that the synthetic pulp and the gas barrier plastic film be selected so that a good heat fusion bondability is attained between them. In the case where there is no fusion bondability between the synthetic pulp and the film, a hot melt adhesive and other adhesives such as a urethane type adhesive is used at the heat-pressing step. As another method, there can be mentioned a method in which a plastic film to be laminated on the non-woven fabric mat is placed on the non-woven fabric mat before the mat is molded into the lid and the assembly is heat-pressed to simultaneously effect molding of the mat and lamination of the film. In this method, it is preferred that the plastic film be capable of being molded under the conditions for molding the non-woven fabric mat, and, if the plastic film has a fusion bondability to the plant pulp and/or synthetic pulp in the mat, covering is further facilitated.

Furthermore, there may be adopted a method in which the non-woven fabric mat is heat-pressed, a plastic film is laminated thereon and thereafter the thus-obtained laminated structure is inserted in the mold where the assembly is then heat-pressed to obtain a molded article.

When a carbon dioxide gas barrier property is imparted to the lid by covering with a gas barrier plastic film, the above-mentioned two-barrier-layer effect can be applied. Namely, the carbon dioxide gas barrier effect can be attained by laminating a gas barrier film on the inner and outer surfaces of the lid member. If the carbon dioxide gas barrier property is still insufficient, an intermedialgas barrier film layer may also be additionally provided in the lid member. Namely, there may be adopted a multi-layer structure of gas barirer film/non-woven mat/gas barrier film/non-woven mat/gas barrier film for the lid member. This laminate structure can easily be constructed by preparing a necessary number of non-woven mats, placing a gas barrier film layer between every two adjacent mats and subjecting the assembly to the heat-pressing.

As pointed out hereinbefore, the pressure-resistant paper vessel of the present invention is preferably comprised of a cylindrical barrel, a bottom lid having a skirt portion on the peripheral edge thereof and a spherical curved surface and a top lid having a skirt portion on the peripheral edge thereof, a spherical curved surface and an opening. The barrel of the vessel of the present invention will now be described.

In the pressure-resistant vessel of the present invention, it is preferred that the vessel barrel have a tightly bonded multiple-layered structure comprising at least two papers, at least one of which is of the gas barrier film/paper/gas barrier film laminate structure.

It now has been found that a single-ply structure of a paper board used for a milk pack or juice pack hardly satisfies the requirement of the pressure resistance for a vessel for beer or carbonated drink. When a paper board is used for formation of a barrel, the paper board is wound one time and both the ends are lap-bonded. When the inner pressure acts on this barrel, peeling or breaking is readily caused in the lap-bonded portion, and the bonding strength is readily varied depending upon the sealing conditions. In the present invention, the varrel preferably has a tightly bonded multiple-layered structure comprising at least two papers, at least one of which is of the gas barrier film/paper/gas barrier film laminate structure. The entire contacting surfaces of paper are tightly bonded together through an adhesive or heat-bondable film, whereby a tightly integrated barrel is obtained. In the so-formed barrel, peeling of the bonded portion can be prevented completely and the pressure resistance is remarkably increased. Thus, a barrel having an excellent quality can be obtained very stably with much reduced deviation.

A trial has already been made to increase the pressure resistance of a vessel by using a barrel having a two-ply wall or multi-ply wall. Japanese Unexamined Utility Model Publication No. 57-46415 mentioned above teaches a pressure-resistant paper vessel comprising a barrel having a double layered structure having two paper layers the entire confronting surfaces of which are bonded together, Japanese Unexamined Patent Publication No. 49-27383 discloses a cylindrical vessel formed by winding a laminated sheet at least two times and securing the wound sheet by baking and it is taught and this vessel is suitable as an aerosol vessel.

In case of a vessel for beer or carbonated drink, it is necessary that the vessel should have a mechanical strength sufficient to resist the inner pressure and permeation of carbon dioxide gas should be prevented. In the present invention, these two problems can be solved simultaneously, and hence, the vessel of the present invention is very significant from the practical viewpoint. In the present invention, in order to prevent permeation of carbon dioxide gas, the above-mentioned two-barrier-layer effect is imparted to the barrel.

This two-barrier-layer effect can be enhanced if a plurality of basic layers of the gas barrier film/paper/gas barrier film structure are piled, and in this case, the gas barrier property is further improved. Namely, increase of the pile number of laminated papers results in improvements of the pressure resistance and gas barrier property, but this results in economical disadvantages. Accordingly, the pile number of laminated papers is appropriately determined in view of the quality stability of the content, the shelf life, the cost and the pressure resistance.

In case of a vessel for beer or carbonated drink, from the practical viewpoint, it is required that the buckling strength should be excellent. The buckling strength of the vessel has significant influences on the filling or capping speed at the content-filling or capping process, and hence, the buckling strength is significant from the industrial viewpoint. The multi-ply barrel of the present invention satisfactorily meets this industrial demand. More specifically, the buckling strength of a single-ply cylinder composed of bleached kraft paper having a basis weight of 230 g/m² and having an inner diameter of 75 mm and a height of 150 mm is 42 kg, while the buckling strength of a two-ply cylinder having the same size and being formed by continuously winding this paper board two times and bonding the confronting surfaces entirely with a starch adhesive is 93 kg. Furthermore, the buckling strength of a single-ply cylinder having the same size and being formed by using a laminated paper obtained by laminating a gas barrier nitrile resin film, "Barex 210", having a thickness of 35 $\mu$m on both the surfaces of the above-mentioned paper board is 57 kg, while the buckling strength of a two-ply cylinder having the same size and being formed by winding the above-mentioned laminated paper two times and heat-fusion-bonding the confronting surfaces of the laminated paper is 150 kg. For comparison, a commercially available 350 ml beer can of aluminum (provided with top and bottom lids) is 156 kg.

Incidentally, the buckling strength referred to in the instant specification is determined according to the following method: A load is applied to a sample vessel vertically thereto at a temperature of 23° C. and a relative humidity of 50%. The load (kg) is measured when deformation start and the buckling strength is expressed by this load.

From the above-mentioned experimental results, it is seen that in case of a paper board alone, the buckling strength of the two-ply structure is 2.2 times that of the one-ply structure, but in case of a laminated paper, the buckling strength of the two-ply structure is 2.6 times the buckling strength of the single-ply structure. It is construed that this is due to the fact that by laminating a gas barrier film on both the surfaces of paper, the rigidity is increased and by piling laminated papers, a synergistic effect is attained. If the buckling strength is 150 kg, this is comparable to the buckling strength of a commercially available aluminum can, and a vessel having such a buckling strength can be used practically satisfactorily. In the foregoing experiments, a Barex film having a thickness of 35 $\mu$m is used and a two-ply cylinder of a laminated paper having a Barex/paper/Barex structure is used as a sample. The above-mentioned effect of improving the buckling strength differs according to the kind and thickness of the gas barrier film and the pile number of the laminated paper, and these factors are appropriately determined according to the desired buckling strength.

Figure 10:
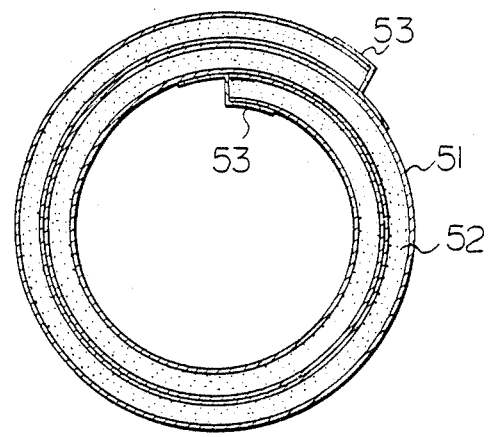
FIG. 10 is sectional view showing the barrel portion of a pressure-resistant vessel formed by winding two times a laminated paper having a structure of gas barrier film/paper/gas barrier film.
Figure 11A:
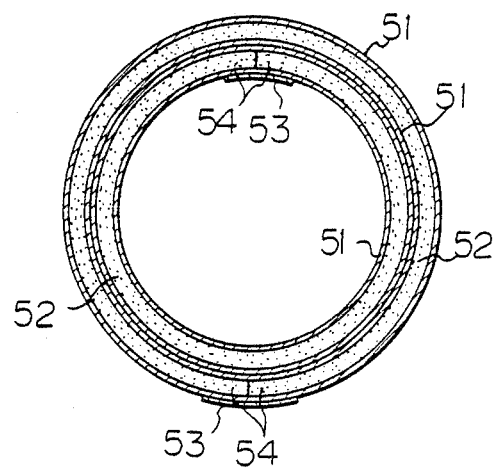
FIG. 11-(a) is a sectional view showing the barrel portion of a pressure-resistant vessel formed by winding two times a laminated paper as shown in FIG. 10, in which both the end edges are butt-bonded.
Figure 11B:
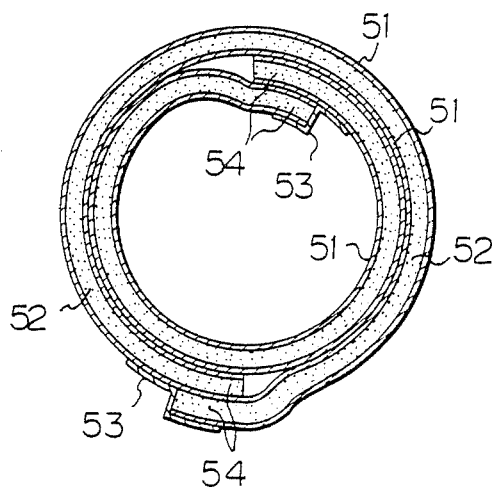

As pointed out hereinbefore, the barrel of the present invention is characterized preferably as possessing a tightly bonded multiple layered structure having at least two papers, at least one of which has a laminate layer of a carbon dioxide gas barrier film/paper/carbon dioxide gas barrier film structure. Accordingly, all of barrels having the above structural features are included within the scope of the present invention. For example, a barrel comprising a laminated paper of a gas barrier film/paper/gas barrier film structure which is continuously wound two times is illustrated in FIG. 10. Furthermore, a barrel comprising an inner cylinder formed by winding the above-mentioned laminated paper one time and an outer cylinder formed on the periphery of the inner cylinder by winding the above-mentioned laminated paper is shown in FIG. 11. More specifically, in the barrel shown in FIG. 11-(a), both the cut edges 54 of the laminated paper of each cylinder are butt-bonded, and the butt-bonding position of the inner cylinder is opposite to the butt-bonding position of the outer cylinder. In FIG. 11-(b), both the cut edges 54 of each cylinder are lap-bonded and the lap-bonding position of the inner cylinder is opposite to the lap-bonding position of the outer cylinder.

In FIGS. 10 and 11, the cut edges 54 of the laminated paper are ordinarily covered with a gas barrier film 53 so as to prevent the paper of the cut edges 54 from falling in contact with the content or outer atmosphere. This covering operation will hereinafter be called "edge treatment".

Various edge treatments have heretofore been reported in connection with sake packs, fruit packs and the like. In the present invention, any of these known treatment methods may be adopted. If this edge treatment is insufficient, the strength of paper is reduced by permeation of the content, and the two-barrier layer effect of the present invention is not sufficiently attained and the reliability of the vessel is degraded. Therefore, an appropriate edge treatment method should be selected in view of the shape of the vessel or the manner of bonding the barrel to the lid member. As the edge treatment method, there are often adopted a method forming a fold 57 as shown in FIG. 12-(a) and a method using a gas barrier tape 58 as shown in FIG. 12-(b), and each method may be adopted in the present invention. Edge treatment methods to be adopted for the barrel where the cut edges are butt-bonded are shown in FIG. 13. More specifically, a gas barrier tape 59 is applied to the bonded portion as shown in FIG. 13-(a) or a gas barrier plastic material 60 is embedded in the bonded portion as shown in FIG. 13-(b).

In the barrel shown in FIG. 11, the structure of the laminated paper in the inner cylinder may be different from that of the outer cylinder. For example, in the case where the required carbon dioxide gas barrier property is attained only by using a laminated paper of a carbon dioxide gas barrier film/paper/carbon dioxide gas barrier structure is used, other cheaper laminated paper to which only the water proofness is given, such as a polyethylene-laminated paper, may be used for the outer cylinder. Examples of the two-ply wall barrel having this structure are shown in the sectional view of FIG. 14. Each example has a multi-layer structure including a carbon dioxide gas barrier film 51 and paper 52, and all the examples shown in FIG. 14 are included within the scope of the present invention, though structures that can be adopted in the present invention are not limited to those shown in FIG. 14. In FIG. 14, reference numeral 55 represents other film or adhesive layer.

It must be noted that in the structures shown in FIG. 14-(a) and FIG. 14-(d), two gas barrier films are bonded together, namely a portion of gas barrier film/gas barrier film is contained in the layer structure. If this portion is included in the layer structure, formation of pinholes is effectively prevented.

This feature will now be described in detail. A gas barrier film is ordinarily prepared according to the T-die method, the inflation method or the casting method. It is said that according to any of these methods, it is difficult to completely prevent formation of pinholes. Pinholes are readily formed by influences of foreign materials, dusts, insoluble additives and cross-linked products (gels) contained in the raw materials. The smaller is the film thickness, the larger is the number of pinholes. Accordingly, in the case where a thin film excellent in the carbon dioxide gas barrier property is used, it is necessary to control formation of pinholes and maintain the reliability at a level comparable to that of a metal or glass. For attaining this object, in the present invention at least one layer of gas barrier film/gas barrier film is preferably included in the laminate structure for the barrel and the lids. More specifically, in each of the barrel and the lids, having the structure specified in the present invention, it is preferred that a layer of carbon dioxide gas barrier film/carbon dioxide gas barrier film formed by heat fusion bonding or by adhesion using an adhesive be contained by at least one turn in the laminate structure.

By the term "one turn" used herein, it is meant that two gas barrier films in the form of one integrated layer are wound one time and the winding-starting edge is integrated with the winding-ending edge by heat fusion bonding or by adhesion using an adhesive. In other words, it is meant that two gas barrier films are integrated with each other in one layer to form an independent cylinder where a closed system (closed circuit) is formed. Incidentally, the sectional shape of the barrel formed by winding the laminate two times, which is shown in FIG. 10, is the same as the section of the structure shown in FIG. 14-(a), but the closed system is not formed in the structure shown in FIG. 10. In each of the structure shown in FIGS. 11-(a) and 11-(b), the closed system is formed. This gas barrier cylinder of the closed system may be arranged on the innermost surface falling in contact with the content or may be interposed in the bonded interface between papers.

FIG. 11 illustrates an embodiment (a) in which both the end edges 54 of paper are butt-bonded and an embodiment (b) in which both the end edges 54 are lap-bonded. From the viewpoint of prevention of leakage of the content, the structure (a) is preferred. In case of the structure (b), since a step is formed on the inner wall face because of increase of the thickness in the lap portion, when the lid member is fitted, there is a risk of formation of a space at this step between the lid and barrel, and formation of such a space results in leakage of the content. In case of the structure (a), a single-ply wall is locally formed in the edge portion of the barrel, and if the inner pressure is relatively high, the stress is concentrated in this portion and it is apprehended that the pressure resistance becomes insufficient in this portion. As means for eliminating these disadvantages, there can be mentioned a double-wall cylinder as disclosed in FIG. 15 where end edges 54 are butt-bonded in an inner cylinder and end edges are lap-bonded in an outer cylinder so that the lap-bonded portion of the outer cylinder is piled on the bonded portion of the inner cylinder.

Incidentally, the wall structure of the cylinder is not limited to those of double-wall cylinders illustrated in FIGS. 10, 11, 14 and 15, but other three-wall and multi-wall structures may be adopted in the present invention. For example, in the case where the strength of the butt-bonded edge portion is insufficient in the structure shown in FIG. 11-(a), there may be adopted a modification shown in FIG. 16 where a laminated paper of the same kind is further wound on the outer periphery to form a triple-wall structure. In this modification, it is preferred that the respective bonded edge portions be separate from one another as much as possible.

From the mechanical viewpoint, in order to reduce the thickness of the barrel, it is preferred that the shape of the barrel be cylindrical, and also from the economical viewpoint, this cylindrical shape is preferred. In the present invention, a square cylinder or rectangular cylinder having a large curvature radius R at four corners can also be adopted. The value R is not particularly critical, but a small value of R rendering the elastic recovery impossible, such as ordinarily adopted for common folded paper vessels, should be avoided in the present invention. When paper is bent with a small value of R, slip or displacement is caused among cellulose fibers in the bent portion and the paper is permanently deformed in the bent portion. When this paper vessel is used as a pressure-resistant vessel, the stress due to the inner pressure is concentrated on the permanently deformed portion and breakage is caused in this portion, resulting in extreme reduction of the pressure resistance of the vessel.

When a gas barrier film is laminated on paper for formation of the barrel of the vessel of the present invention, there may be adopted any of conventional lamination methods such as the wet lamination method, dry lamination method, hot melt lamination method, extrusion lamination method and coextrusion method. An appropriate lamination method may be selected depending upon the kind and layer structure of the gas barrier film and the lamination processability thereof.

The kind of paper constituting the barrel of the vessel of the present invention is not particularly critical, as pointed out hereinbefore. The thickness of paper should be deterined according to the required pressure resistance. Namely, if the thickness is too small, the winding number should be increased to maintain the required pressure resistance and the process becomes complicated, resulting in economical disadvantages. If the thickness is too large, the processing becomes difficult and since the size of the step in the lapped portion is increased, leakage is readily caused and the appearance is degraded. Accordingly, in the present invention, it is ordinarily preferred that the basis weight of paper in the barrel be in the range of from 70 to 500 g/m². If the paper thickness is within this preferred range, a satisfactory vessel for beer or carbonated drink can be provided.

As pointed out hereinbefore, the pressure-resistant paper vessel of the present invention comprises a cylindrical barrel, a bottom lid and a top lid. Considerations are paid not only to the structures of the respective members but also to the methods of bonding the lids to the barrel and the strength of the bonded portion, and by dint of these considerations, the intended pressure-resistant paper vessel of the present invention is completed. From the viewpoint of the mechanical strengths, the bonded portion between the barrel and lid is inferior and defects readily appear in this portion. The strength of this bonded portion has a close relation to the design of the structures of the barrel and lid, and the pressure resistance and strength of the bonded portion, namely the pressure resistance and strength of the vessel as a whole, are determined by the design of the structures of the barrel and lid.

The pressure-resistant paper vessel of the present invention has, for example, a structure as shown in FIG. 4 in which peripheral surfaces of skirts 32d formed on lid members 32 and 32' are tightly bonded and secured to the inner circumferential surfaces of the top and bottom ends of a cylindrical barrel 31 having a multi-wall structure. In this embodiment, the lid members 32 and 32' are tightly bonded to the barrel 31 through an adhesive or thermoplastic resin films laminated on the outermost layers of the lid members and barrel according to the heat fusion bonding method, ultrasonic bonding method or high-frequency induction heating fusion bonding method.

It is preferable that the paper-making direction of the paper constituting the innermost layer of the barrel to be bonded to the skirt of the lid be in alignment with the axial direction of the vessel, that is, the direction connecting the top and bottom walls to each other. This will now be described in detail.

Ordinarily, paper is formed according to the method using a paper-making machine. The physical properties, such as tensile strength and elongation, of paper are not uniform in all the directions. That is, the physical properties of paper are anisotropic. The anisotropic property is determined by characteristics in the paper-making direction and characteristics in the direction rectangular to the paper-making direction. We considered that the above-mentioned unevenness of the pressure resistance in the bonded portion is significantly influenced by this anisotropic property, and various pressure resistance tests were made repeatedly on two types of vessels, that is, a vessel having as barrel formed by using a laminated paper comprising a gas barrier film and paper and winding the laminated paper so that the paper-making direction of the paper is in alignment with the axial direction of the vessel and a vessel having a barrel formed by winding the above-mentioned laminated paper so that the paper-making direction of the paper is in alignment with the circumferential direction of the vessel. From the results of these tests, it has been found that a vessel having a barrel formed by winding a laminated paper so that the paper-making direction is in alignment with the axial direction of the vessel is especially excellent in the pressure resistance of the bonded portion and this excellent pressure resistance is very stable without any substantial unevenness.

When an inner pressure acts on a thin cylindrical vessel having both the ends closed, the stress generated on the cylinder wall is roughly divided into two types, that is, the circumferential stress $\sigma_t$ acting in the circumferential direction and the axial stress $\sigma_z$ acting in the axial direction. Assuming that the inner pressure is p, the inner radius of the cylinder is r and the thickness of the cylinder is t, the following relations are established:

$$\sigma_t = pr/t \text{ and } \sigma_z = pr/2t = \sigma_t/2$$

Accordingly, the pressure resistance of the cylindrical vessel is determined by the circumferential stress. More specifically, in case of a paper vessel, from the viewpoint of the pressure resistance of the barrel, it is preferred that the paper-making direction of the paper where the tensile strength of the paper is excellent be in alignment with the circumferential direction of the cylinder. Futhermore, in case of paper, the elongation under the stress is smaller in the paper-making direction than in the direction rectangular thereto, and also in view of deformation of the cylinder under influences of the inner pressure, it is preferred that the paper-making direction be in alignment with the circumferential direction of the cylinder, because the degree of deformation is reduced. These considerations, however, are contrary to the above-mentioned finding concerning the paper-making direction. Namely, there arises such a problem that if the strength of the bonded portion is increased by making the paper-making direction in alignment with the axial direction of the cylinder, the pressure resistance of the barrel is reduced and deformation of the barrel is increased.

Figure 17:
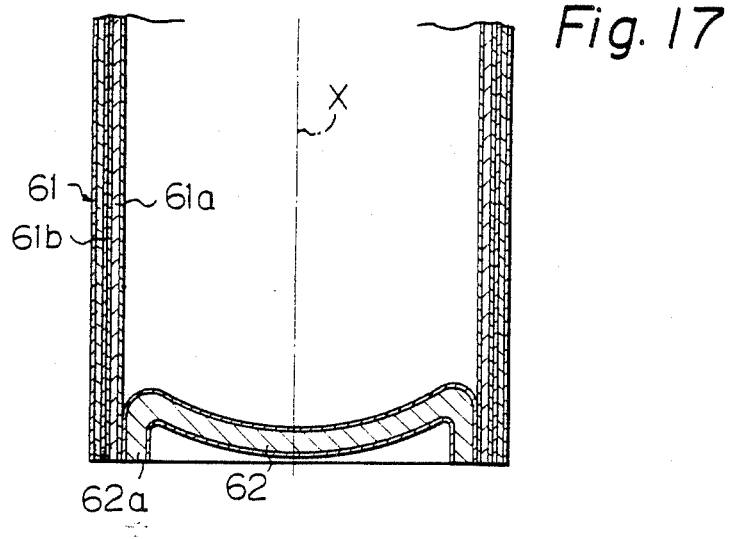
FIG. 17 is a sectional view showing an example of a multi-ply structure for the barrel portion and lid member of the pressure-resistant vessel.

It has been found that this problem is effectively solved by adoption of the multi-wall structure of the present invention. We made investigation on a vessel having a cylinder 61 having a multi-wall structure shown in FIG. 17 where the paper-making direction of paper 61a constituting the innermost paper layer is in alignment with the axial direction of the vessel and the paper-making direction of paper 61b constituting other layer, that is, a layer located on the outer side of the innermost paper layer, is in alignment with the circumferential direction of the vessel, in connection with the pressure resistance of the barrel and the strength of the bonded portion. From the results of the investigation, it has been found that a vessel having the above-mentioned structure is excellent in the strength of the bonded portion between the barrel and lid, the pressure resistance of the barrel of the vessel is substantially comparable to that of a barrel of a vessel of the same laminate structure in which the paper-making direction of each paper is in alignment with the circumferential direction of the barrel, and the degree of deformation is substantially equal to that of the above comparative vessel.

More specifically, if the structure in which the paper-making direction of paper 61a constituting the innermost paper layer is in alignment with the axial direction X of the barrel and the paper-making direction of paper 61b constituting a layer located on the outer side of the innermost paper layer is in alignment with the circumferential direction of the barrel is adopted for the pressure-resistant paper vessel of the present invention, the pressure resistance of the barrel and the bonding strength between the barrel and lid can be increased to satisfactory levels.

In the above-mentioned feature of the present invention concerning the paper-making direction of paper constituting the barrel, one of the objects is to increase the strength of the bonded portion between the barrel and lid. In order to attain this object, it is indispensable that in a vessel barrel having a multi-wall structure shown in FIG. 17, the paper-making direction of paper 61a constituting the innermost paper layer should be in alignment with the axial direction X of the vessel. In other words, if the paper-making direction of paper 61a constituting the innermost paper layer is in agreement with the axial direction X of the vessel, the paper-making direction of paper 61b in a layer on the outer side of the innermost paper layer is not particularly critcal. However, if the paper-making direction of paper 61b in the layer on the outer side of the innermost layer is in alignment with the axial direction X of the vessel, in order to maintain a good pressure resistance in the barrel and control the degree of deformation to a low level, it is necessary to increase the winding number of paper, that is, the number of laminated paper layers, and therefore, the step number is increased and the weight is increased, resulting in economical disadvantages.

As pointed out hereinbefore, the strength of the bonded portion between the barrel and lid is drastically increased if the paper-making direction of paper in the barrel is appropriately taken into consideration in constructing the bonded portion. However, in case of a pressure-resistant vessel, a higher strength is often required according to the kind of the content. In this case, increase of the strength attained by making the paper-making direction of paper in alignment with the axial direction of the vessel is insufficient, and further increase of the strength is required.

For example, when lids having an outer diameter of 75 mm are bonded to the ends of a barrel having an inner diameter of 75 mm through skirts having an effective bonding width of 10 mm and an inner pressure of 10 kg/cm$^2$G is applied to the formed vessel, a load of 442 kg is imposed on the inner surfaces of the lids. Accordingly, a shearing force of 442 kg acts on the bonded portion, and if the effective bonding width is 10 mm, the bonded portion should resist the shearing stress of 18.8 kg/cm$^2$G. The bonded interface of the bonding portion can sufficiently resist such a shearing stress, but since the shearing strength of paper per se of the barrel is about 15 kg/cm$^2$ even if high quality paper composed of long pulp fibers is used, longitudinal tearing is caused in the paper layer adjacent to the bonded portion. In this case, the above disadvantage will be overcome if the width of the bonded portion between the barrel and lid and the effective bonding area, that is, the area of the skirts are increased. However, the shape characteristics of the vessel are degraded in this case. It has been found that the above disadvantage is effectively eliminated if a film or sheet of a thermoplastic resin having a width larger than the effective bonding width of the skirt of a lid is applied to the entire periphery of the bonded portion of a barrel and lids are bonded to the top and bottom ends of the barrel. Incidentally, there is no clear distinction between a film and a sheet. Ordinarily, a product having a thickness smaller than 100 $\mu$m is called "film" and a product having a thickness of at least 100 $\mu$m is called "sheet". Accordingly, the film or sheet will inclusively be called "film" hereinafter.

Figure 18:
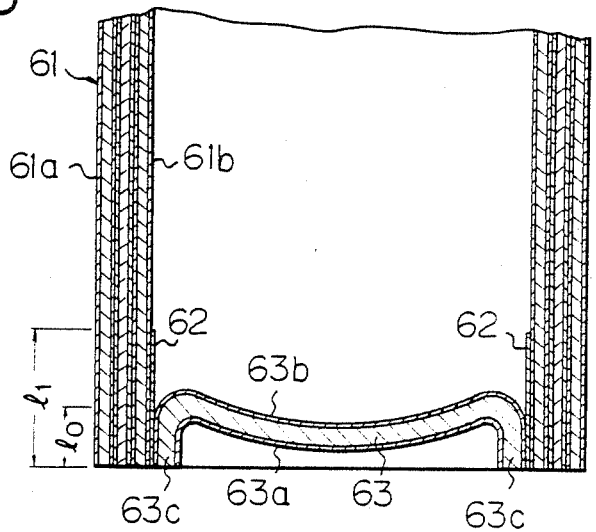
FIG. 18 is a sectional view showing another example of a multi-ply structure for the barrel portion and lid member of the pressure-resistant vessel.

FIG. 18 is a sectional partial view showing the above-mentioned structure. Referring to FIG. 18, both the surfaces of a cylindrical barrel composed of paper are laminated with gas barrier plastic films 61a and 61b, respectively, and a thermoplastic resin film 2 is bonded to the end portion of the barrel 61. A lid member 63 having a skirt 63c laminated with gas barrier plastic films 63a and 63b is tightly bonded to the end portion of the barrel 61 through the film 62. The strength of this bonded portion formed by using the film 62 is much excellent over the strength attained only by bonding the skirt to the barrel, and hence, an effectively reinforced vessel can easily be obtained. Namely, be effecting the bonding through this film, there can be attained an effect similar to the effect attained by increasing the effective bonding area of the skirt of the lid.

It has been found that another unexpected effect can be attained by use of this film. When the inner pressure acts, by the stress produced within the cylindrical wall of the barrel, especially the stress in the circumferential direction, the barrel is deformed so that it expands outward. If the degree of this deformation is high, in addition to the shearing stress, a force going to peel the bonding is imposed on the bonded portion between the barrel and lid, resulting in reduction of the strength of the bonded portion. However, if the film is applied to the bonded portion in the above-mentioned manner, deformation of the barrel is controlled in the vicinity of the bonded portion, and therefore, the strength of the bonded portion is further enhanced.

The film has a width larger than the effective bonding width of the skirt portion and has such a length that the film can be bonded along the entire periphery of the bonded portion. In the case where the portion to be broken by the inner pressure is the barrel-forming paper layer adjacent to the bonded portion and the bonded interface between the films has a sufficient bonding stress, assuming that the effective bonding width of the skirt portion is $l_0$ and the width of the film is $l_1$, the strength of the bonding protion in the above-mentioned structure is increased to a level $l_1/l_0$ times as high as the level attainable when the barrel is merely bonded to the skirt portion as in the conventional method. Accordingly, the larger is the value of $l_1$, the higher is the effect. However, from the results of experiments made by us, it has been found that if the width $l_1$ is increased beyond a certain level $l_2$, fracture is caused in the film an any further improvement cannot be expected. The value $l_2$ depends on the physical properties of the thermoplastic resin used for the film, especially the tensile strength and thickness.

A thermoplastic resin having a higher tensile strength is preferably used for the film. For example, polyester and polyamide films, biaxially oriented polyester and polyamide films, and the above-mentioned nitrile resin films and sheets marketed under the tradename of "Barex 210" or "Lopac".

If only the enhancement of the strength of the bonded portion is taken into consideration, a larger thickness is preferred for the film. However, in view of the inherent object of providing a vessel composed mainly of paper or the intended reduction of the step formed on the bonded surface between the barrel and skirt portion at the time of bonding the lid to the barrel, a smaller thickness is preferred. In view of the foregoing, it is preferred that in case of a polyester or polyamide film, the thickness be 10 to 100 $\mu$m and in case of Barex 210, the thickness be 50 to 300 $\mu$m.

Since the film is tightly bonded to the barrel and the skirt portion of the lid, in view of simplification of the manufacturing process, it is preferred that the film should have a good fusion-bondability to the films laminated on the barrel and lid. If this fusion bondability is poor, an adhesive may be used or a film laminated with other film having an excellent heat fusion bondability may be used.

Figure 19:
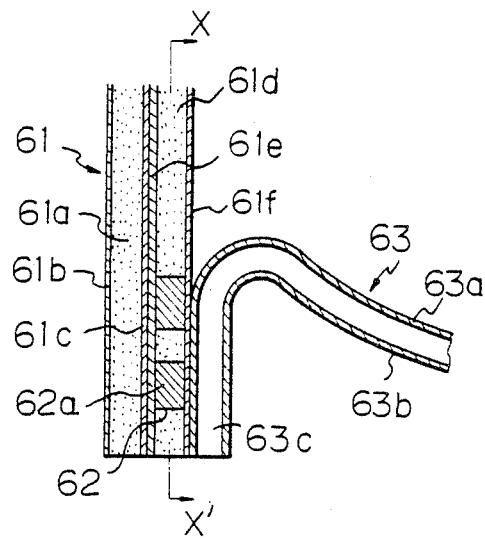
FIG. 19 is a sectional view showing an example of a reinforced structure of a bonded portion for the barrel portion and lid member of the pressure-resistant vessel.

As another means for increasing the strength of the bonded portion, formation of a bonded portion having a sectional structure as shown in FIG. 19 can be mentioned. More specifically, in the pressure-resistant paper vessel of the present invention where the inner circumferential surface of the barrel is tightly bonded and secured to the lid member having on the peripheral portion thereof a skirt portion to be fitted in the barrel, there is provided a structure of the bonded portion wherein paper forming the innermost layer of the barrel has a plurality of holes formed in the skirt-fitted portion of the barrel, said holes are filled with a thermoplastic resin and plastic films laminated on both the surface of the paper forming the innermost of the barrel are tightly bonded and secured to each other through said thermoplastic resin filled in the holes.

Referring to FIG. 19, the structure shown herein comprises a barrel 61 having paper layers 61a and 61d and a lid 63 having on the peripheral portion a skirt 63c to be fitted in the barrel for bonding. The paper layer 61a is laminated with plastic films 61b and 61c and the paper layer 61d is laminated with plastic films 61e and 61f, and the paper 61d has holes 62 in the portion to be bonded to the skirt 63c of the lid 63. A thermoplastic resin 62a is filled in the holes 62. Plastic films laminated on both the surfaces of the paper layer 61d are tightly bonded to each other through the filled thermoplastic resin 62a. The lid 63 is laminated with plastic films 63a and 63b.

If the films laminated on both the surfaces of paper forming the innermost layer of the barrel are bonded to each other by the thermoplastic resin filled in holes formed in said paper in the portion to be bonded to the skirt 63 of the lid, the strength of the bonded portion between the barrel and the skirt is further increased over the strength attained when the barrel is merely bonded to the skirt of the lid.

More specifically, because of the presence of the resin 62a filled in the paper 61d forming the innermost layer of the barrel, shearing breakage of the paper layer is prevented. Namely, the strength at break of the paper layer can be utilized to the maximum. Moreover, since the innermost film 61f is integrated with films 61e and 61c through the filled resin, the strength of the films 61e and 61c and the shearing strength of the paper layer 61a constituting the outer layer of the barrel are added to the strength of the innermost film 61f, and for this reason, it is considered that the bonding strength is especially increased.

Figure 20:
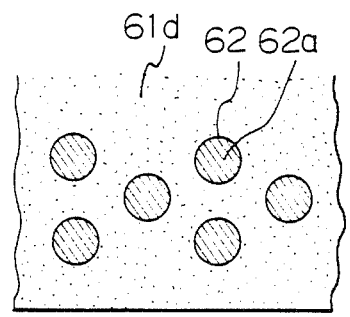
FIG. 20 is a view showing the section taken along the line X—X' in FIG. 19.

In the bonded portion having the above-mentioned structure, the shape and size of the holes are not particularly critical, and they are appropriately determined according to the shape of the bonded portion or the required pressure strength. In order to attain the strength-increasing effect uniformly along the entire bonded portion, it is preferred that the holes be arranged at uniform intervals in the circumferential direction of the barrel. For example, circular holes may be arranged at equal intervals along the entire circumference of the bonded portion as shown in FIG. 20. Incidentally, FIG. 20 is a view showing the section taken along the line X–X' in FIG. 19.

The foregoing description has been made with respect to the strength increasing structure for the bonded portion of the barrel. The strength of the bonded portion of the lid member can also be increased by adoption of a similar structure. More specifically, the strength of the bonded portion of the lid member may be increased by forming similar holes in the skirt portion of the lid member and fillng a thermoplastic resin into these holes.

Figures 21A, 21B, 21C:
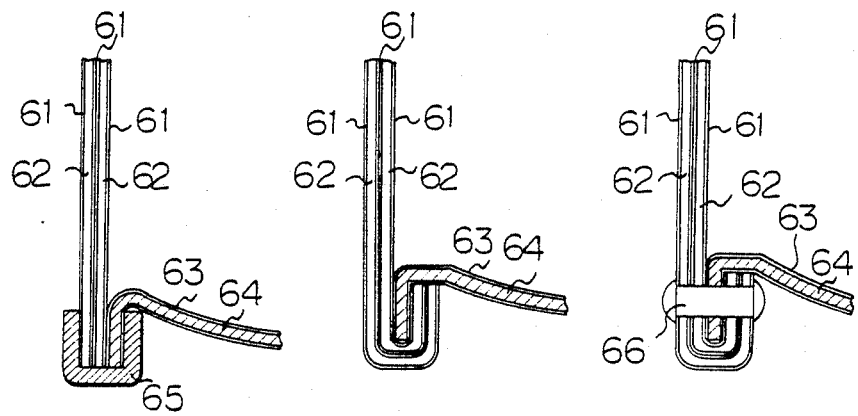
FIGS. 21-(a), 21-(b) and 21-(c) are sectional views showing examples of a reinforced structure of a bonded portion for the barrel portion and lid member of the pressure-resistant vessel.

As another method for increasing the bonding strength, there may be considered a method shown in FIG. 21. FIG. 21-(a) shows a structure in which a ring having a ]-shaped section, which is formed of a hard plastic material or a metal, if fitted in the bonded portion between the end of the barrel and the lid member so as to reinforce the bonded portion. FIG. 21-(b) shows a structure in which the end portion of the barrel is folded inward and the lid is supported in the folded portion as in case of a paper cup. FIG. 21-(c) shows a structure adopted when the strength is still insufficient in the structure shown in FIG. 21-(b), wherein mini-rivets 66 of aluminum or the like are driven in the bonded portion.

In the case where the method of folding inward the end portion of the barrel as shown in FIG. 21-(b) or 21-(c) is applied to the barrel of the present invention having the above-mentioned multi-wall structure, the thickness of the folded portion is increased because of the multi-wall structure and folding per se is considerably difficult. Furthermore, even if the folded portion is formed, wrinkling is extreme in the lapel portion and the appearance characteristic is degraded.

It has been found that the above-mentioned disadvantage is eliminated when the paper layer as the outermost layer of the barrel is folded inward. More specifically, in the pressure-resistant paper vessel of the present invention where the inner circumferential surface of the barrel having a multi-wall structure is bonded to the outer peripheral surface of the lid member having on the periphery thereof a skirt portion to be fitted in the barrel for bonding, said skirt portion being folded toward the inner circumferential edge of the barrel, there is provided a structure for the bonded portion wherein the paper layer forming the outermost layer of the barrel is folded inwardly of the barrel and the folded portion is tightly bonded to the skirt portion of the lid so that the folded portion covers the skirt portion.

Figure 22:
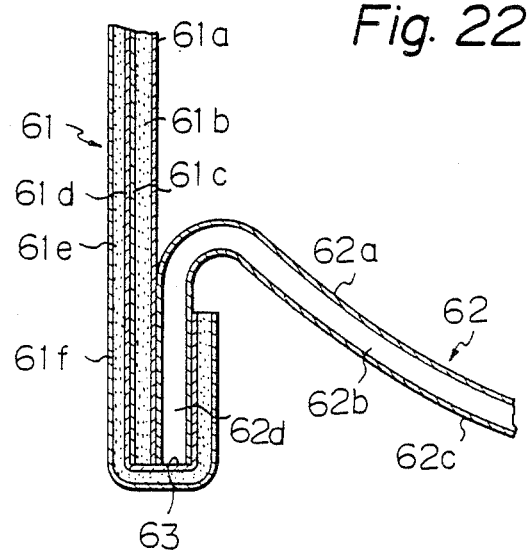
FIG. 22 is a sectional view showing still another example of the reinforced structure.

FIG. 22 is an enlarged view showing the section of an example of the above-mentioned structure of the bonded portion in the vessel of the present invention. Referring to FIG. 22, the vessel comprises a barrel 61 having two paper layers 61b and 61e and a lid member 62 having on the peripheral portion thereof a skirt 62d to be fitted in the barrel for bonding. The end portion of the paper layer 61e forming the outer layer of the barrel 61 is folded inward and is bonded and secured to the inner circumferential surface of the skirt 62d of the lid member 62. Bonding of the peripheral surface of the skirt to the inner circumferential surface of the barrel and bonding of the inner circumferential surface of the skirt to the folded portion of the barrel can be accomplished by the heat fusion bonding method, ultrasonic fusion bonding method, high-frequency induction heating fusion bonding method or, if necessary, the bonding method using an adhesive.

In the above-mentioned structure for the bonded portion, when a barrel having an inner diameter of 75 mm is bonded to a lid member having an outer diameter of 75 mm through a skirt having an effective bonding width of 10 mm and an inner pressure of 10 kg/cm$^2$G is imposed on the bonded portion, a shearing stress of 18.8 kg/cm$^2$ acts on the skirt. Assuming that the shearing strength of paper of the barrel is 15 kg/cm$^2$, in order to resist this inner pressure, the remaining shearing stress, that is, 3.8 kg/cm$^2$, can be held by the above-mentioned structure of the bonded portion. In the above-mentioned structure, the tensile strength of the outermost paper layer of the barrel, which is obtained by folding the end portion in the above-mentioned manner, is added to the shearing strength of 15 kg/cm$^2$. Assuming that the strength at break of the paper forming the outermost layer is 300 kg/cm$^2$, the thickness of the outermost paper layer is 300 $\mu$m and the tensile is utilized completely (100%), a tensile strength of 9 kg/cm$^2$ is further imparted to the bonded portion. Namely, the above-mentioned structure can sufficiently resist the inner pressure of 10 kg/cm$^2$G.

In the structure shown in FIG. 22, when the outermost layer 61e is folded, a space 63 is formed between the end face of the innermost layer 61b and the end face of the skirt 62d. It is preferred that this space 63 be as small as possible, and it is especially preferred that this space 63 be completely eliminated by filling the space 63 by using an adhesive or the like. Namely, if this space 63 is eliminated and an integral bonded portion is formed, the tensile strength of the paper of the folded portion is effectively added to the bonding strength.

If the above-mentioned structure of the bonded portion is adopted, also the problem of the edge treatment of the exposed edge of paper in the end portion of the barrel can be solved.

In case of a paper vessel, in order to prevent fibers of paper from falling in contact with the content or outer atmosphere, the exposed portion of paper, for example, the end face is ordinarily covered with a film of a thermoplastic resin such as polyethylene or coated with wax or the like. This edge treatment is especially important in case of a vessel on which an inner pressure acts and in which permeation of carbon dioxide gas should be prevented, such as a vessel for beer or carbonated drink. In the above-mentioned structure, since the outermost layer of the barrel covers the exposed end face of the inner layer of the barrel and the exposed end face of the skirt portion of the lid member, the above problem of the edge treatment can simultaneously be solved. In short, the edge treatment need not particularly be carried out.

In the structure shown in FIG. 22, a film 61f of a thermoplastic resin such as polyethylene is applied to the peripheral surface of the outermost paper 61e. If a higher carbon dioxide barrier property is required, it is preferred that a gas barrier film be used as the covering film 61f.

However, a gas barrier film is ordinarily expensive and it is desired that the amount used of the gas barrier film will be reduced. Moreover, in case of a vessel having a broad marketability such as the vessel of the present invention, it is apprehended that the covering film will be damaged by rough handling or the like and the gas property will be lost in the damaged portion.

In order to attain a complete reliability of the gas barrier property and obtain a highest effect in covering the exposed end face, it is preferred that in the barrel having the bonded portion having the above-mentioned structure, at least the inner circumferential surface of the paper forming the outermost layer be covered with a gas barrier film. For example, as shown in FIG. 22, the inner circumferential surface of the paper 61e forming the outermost layer of the barrel 61 is covered with a gas barrier film 61d.

Several structures for increasing the strength of the bonded portion in the pressure-resistant paper vessel of the present invention have been described above. Each of them can be applied to the pressure-resistant paper vessel of the present invention, and in each case, a practically excellent effect can be attained. Any of the above-mentioned means for attaining these structures for the bonded portion can be adopted. Appropriate means should be selected and adopted according to the required pressure resistance, the intended design, the preparation conditions on an industrial scale and the economical factors.

As pointed out hereinbefore, in the pressure-resistant paper vessel of the present invention, special considerations are paid to the barrel, lid member and bonded portion so that the vessel can sufficiently resist a high inner pressure produced by beer or carbonated drink. Of course, this inner pressure resistance should be maintained at least during the quality-guranteeing period in the pressure-resistant paper vessel of the present invention. However, since the vessel of the present invention is composed mainly of paper, if a high inner pressure is imposed for a long time, it is apprehended that a problem of creep deformation will arise, though this problem does not arise in case of a metal can or glass bottle.

Figure 23:
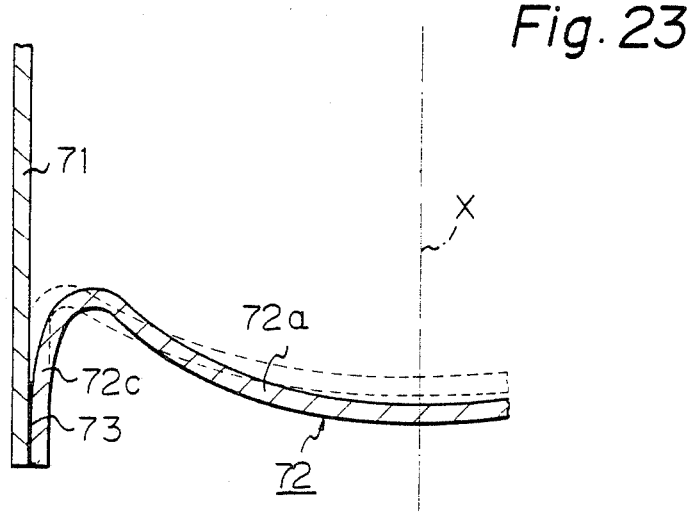
FIG. 23 is a sectional view illustrating the state of peeling of the bonded portion for the barrel portion and lid member of the pressure-resistant vessel.

For example, in case of a vessel having a shape as shown in FIG. 4, the stress generated by the inner pressure is readily concentrated in the vicinity of the bonded portion and creep deformation is caused in this portion, and in an extreme case, the bonded portion is damaged because of this creep deformation. This state is illstrated in FIG. 23. Namely, FIG. 23 is an enlarged view of the main part of the bonded portion having the structure shown in FIG. 4, which illustrates the state where the inner pressure is imposed on the bonded portion, deformation is caused and the bonded portion is peeled.

It has been found that the above-mentioned disadvantage can be eliminated by inscribing a ring to the top end part of the bonded portion on the outer surface side of the lid member.

Namely, in order to obviate the above disadvantage, there is adopted a structure in which a skirt portion of a lid extending outwardly from a curved edge part of a spherical portion of the lid in parallel to the axis of a cylindrical barrel is bonded to the inner circumferential surface of the end portion of the barrel and a rigid ring is inscribed to the innner circumferential surface of said curved edge part of the lid.

Figure 24:
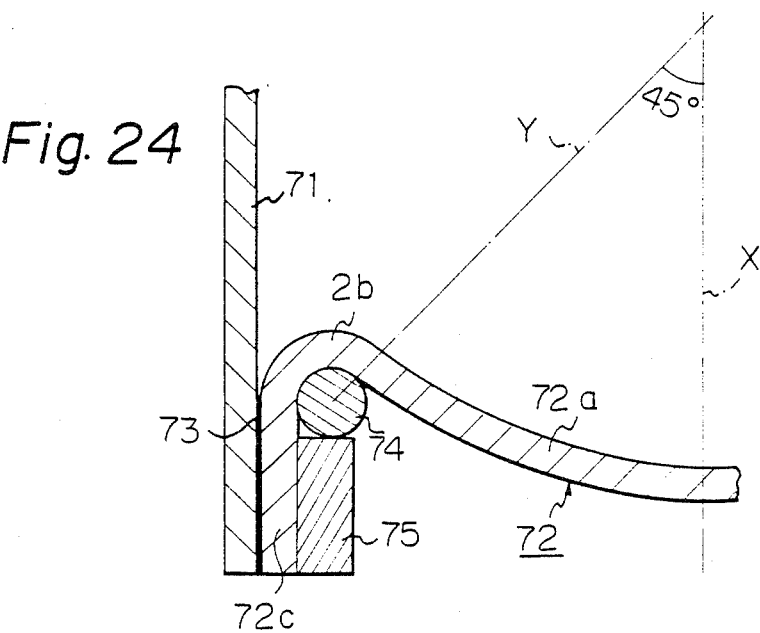
FIG. 24 is a sectional view illustrating still another example of the reinforced structure of a bonded portion for the barrel portion and lid member of the pressure-resistant vessel.
Figure 25A:
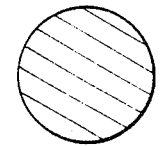
FIGS. 25-(a), 25-(b), 25-(c) and 25-(d) are diagrams showing sectional shapes of reinforcing rings to be used for a reinforced structure as shown in FIG. 24.
Figure 25C:
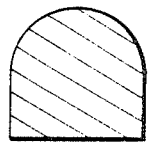
Figure 25B:
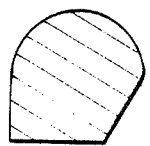
Figure 25D:

An example of this structure is shown in a sectional view of FIG. 24. Referring to FIG. 24, a lid 72 having a spherical portion 72a is tightly bonded to the end portion of a barrel 71 through a bonded portion 73 bonded or heat-sealed with a skirt portion 72c of the lid 72 extending outwardly from a curved peripheral edge part 72b of the spherical portion 72a in parallel to the axis X of the barrel 71. A ring 74 is inscribed to the curved edge part 72b of the lid 72 and a stopper 75 is disposed to prevent the ring 74 from falling down and is bonded to the skirt portion 72c. In this structure, the ring 74 has a rigidity and is inscribed to the curved edge part 72b of the lid 72 so that the top end part of the skirt portion 72c is strongly pressed to the barrel 71.

The section of the ring 74 may be circular as shown in FIG. 25-(a). Furthermore, the ring 74 may have other sectional shape determined appropriately according to the shape of the stopper, such as sectional shape as shown in FIG. 25-(b) or 25-(c). Moreover, the ring 74 may be integrated with the stopper 75 as shown in FIG. 25-(d).

As the material of the ring, there may be used plastics, aluminum, steel, ceramics, wood and plastic-coated hard paper.

The stopper 75 may have an annular continuous shape or it may be discontinuous on the inner circumferential surface of the skirt portion 72c. The stopper 75 should be bonded to the skirt portion so strongly that the stopper 75 can sufficiently resist a large load received from the ring 74 on the inner circumferential surface of the skirt portion 72c in a direction parallel to the axis X of the barrel 71.

When the inner pressure is imposed on the above-mentioned structure, the inner pressure acts on the spherical portion 72a and is going to pull inwardly the top end of the bonded portion 73. However, this pulling action is blocked by the rigidly of the ring 74. Futhermore, the pressure received by the ring at the point falling in contact with the curved edge part 72b of the lid 72 is converted to a horizontal component and a vertical component, and by the horizontal component of force, the ring 74 is caused to press the top end of the bonded portion 73 to the barrel 71. The vertical component of force exerts a function of pressing down the ring 74, but since this component of force is smaller than the force of pressing down the bonded portion 73 if in the absence of the ring 74 and since the resistance of the bonded portion 73 against the pulling-down force and the frictional resistant generated on the bonded portion 73 by the horizontal component of the pressure are further added, the ring 74 is prevented from falling down by the stopper 75 supporting the ring 74 from below. Thus, even if the inner pressure is imposed on the vessel, deformation of the bonded portion is effectively controlled, and peeling or breakage of the bonded portion can be prevented completely.

Still another embodiment of the pressure-resistant vessel of the present invention will now be described with reference to FIGS. 26 and 27.

Figure 26A:
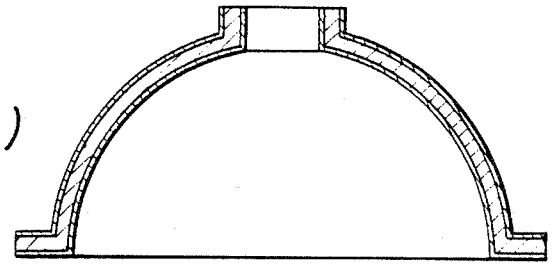
FIG. 26 is a diagram illustrating the sectional shape of another example of the pressure-resistant vessel.
Figure 26B:
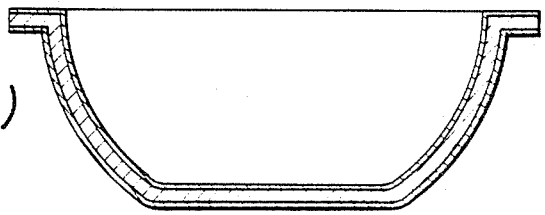
Figure 27:
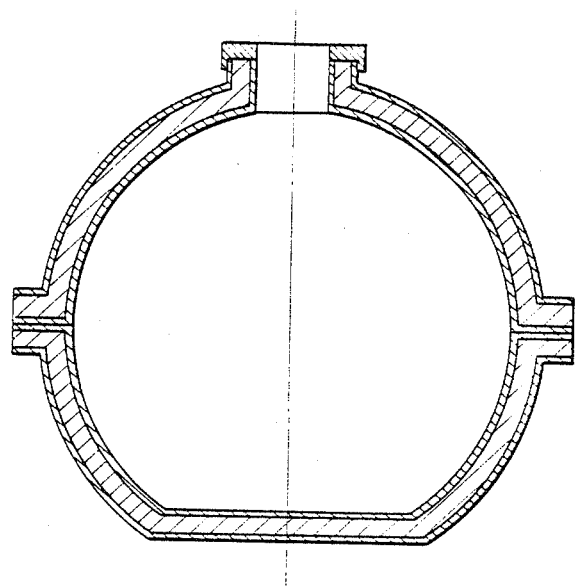
FIG. 27 is a diagram illustrating the sectional shape of still another example of the pressure-resistant vessel.

A gas barrier plastic film, a non-woven fabric mat paper sheet and a gas barrier plastic film are piled in this order on a hot press, and hot pressing is carried out in one stage or two stages, whereby semi-spherical upper and lower vessel members having sections as shown in FIGS. 26-(a) and 26-(b) are formed. Each of the front and back surfaces of the semi-spherical vessel members is strongly laminated with the water-proof gas barrier plastic film, but end faces are not covered with the plastic film. Accordingly, the end faces are covered with a plastic film of the same kind or coated with a Saran coating agent to prevent intrusion of water from the outside or permeation of carbon dioxide gas contained in the liquid content (this treatment is called "end face treatment"). Then, a plastic tap ring formed by injection molding is fitted in the top end of a tap of the upper vessel member and is then bonded by a hot-melt adhesive or fusion-bonded by ultrasonic welding if the tap ring is composed of a plastic material of the same kind as or compatible with the plastic material of the plastic film used for the end face treatment. Then, the upper and lower vessel members are piled together at bonding flanges thereof formed in the equatorial portion and they are tightly bonded by ultrasonic welding or with the aid of an adhesive. In case of ultrasonic welding, the upper and lower vessel members ar piled together in the above-mentioned manner, and an annular ultrasonic wave-applying horn is located on the upper vessel member above the bonding flange while the lower vessel member is supported by a stand, and an ultrasonic wave of about 20 KHz is applied for 1 to 2 seconds under a bearing load of 10 to 20 kg/cm$^2$ to fusion-bond the confronting plastic films to each other. By the above-mentioned bonding operation, an integrated vessel having a section as shown in FIG. 27 can be obtained. Then, a content is filled in the so-formed vessel, and a cap or lid is attached to the top face of the tap ring by fusion bonding or adhesion with an adhesive, whereby a pressure-resistant paper vessel is obtained.

The width of the bonding flanges in the equatorial portion for bonding the upper and lower semi-spherical vessel members is appropriately determined depending upon the particular content liquid so that the inner pressure can sufficiently be resisted. Furthermore, the bonding flanges are gripped from above and below partially or along the entire circumference so as to attain a reinforcing effect. Various modification or changes can be made to the embodiment shown in FIGS. 26 and 27. For example, instead of the above-mentioned upper and lower members, there may be used two longitudinally split vessel members, or three vessel members, for example, a spherical upper member, a spherical lower member and a straight cylindrical member to be interposed between the upper and lower members, may be used.

The present invention will now be described in detail with reference to the following examples that by no means the scope of the invention.

EXAMPLE 1

Figure 28:
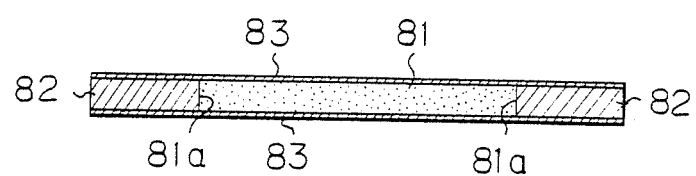
FIG. 28 is a sectional view illustrating an example of a laminate structure of gas barrier film/paper/gas barrier film.

As shown in a sectional view of FIG. 28, along the periphery of bleached kraft paper 81 having a diameter of 80 mm and a basis weight of 230 g/m$^2$ (processed base paper A supplied by Kasuga Seishi Kogyo K.K.) was arranged a sheet 82 of Barex 210 having the same thickness as that of the paper 81, and films 83 of Barex 210 having a thickness of 50 μm were laminated on both the surfaces of the so-formed sample by fusion bonding carried out at a temperature of 130° C. and a speed of 10 mm/sec in a commercial laminator to obtain a laminate having a Barex/paper/Barex structure shown in FIG. 28. Incidentally, the Barex sheet 82 was disposed along the periphery of paper 81 as a spacer for preventing permeation of carbon dioxide gas through the end face 81a of paper 81.

The so-obtained laminate was set at a carbon dioxide gas permeation tester (Permatran Model C-IV supplied by Mocon Co.), and the carbon dioxide gas permeability was measured at a temperature of 50° C. and a relative humidity of 0%.

Figure 29:
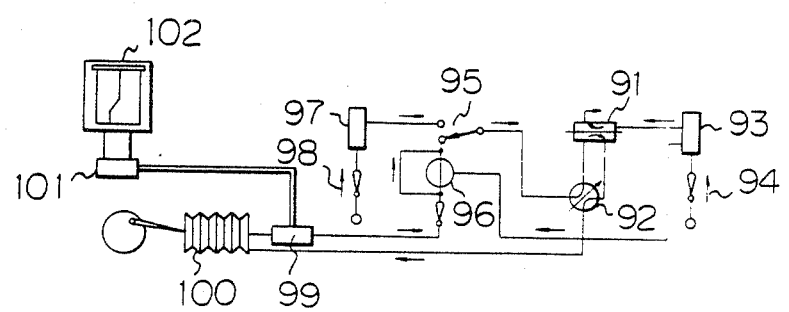
FIG. 29 is a diagram illustrating an apparatus for measuring the carbon dioxide gas permeability.

FIG. 29 is a flow diagram illstrating the measurement principle of this tester. In this tester, a sample is placed on a diffusion cell 91. Carbon dioxide gas is caused to flow on one surface of the sample through a flow meter 94 and a manifold 93. Nitrogen gas is caused to flow on the other surface through a flow meter 98 and a manifold 97. The amount of carbon dioxide gas permeating into the nitrogen current through the sample is measured. In FIG. 29, reference numerals 92, 95, 96, 99, 100, 101 and 102 are a station valve, an autoscanning valve, a calibration valve, an IR sensor, a pump, an amplifier and a recorder, respectively.

For comparison, the carbon dioxide gas permeabilities of a laminate of a Barex/air layer/Barex structure which was the same as the laminate shown in FIG. 28 except that the paper layer 81 was removed and a two-ply laminate prepared by fusion-bonding only the peripheral portions of two piled Barex films having a thickness of 50 μm according to the teaching of Japanese Examined Patent Publication No. 56-40032 were measured under the same conditions as described above.

Figure 30:
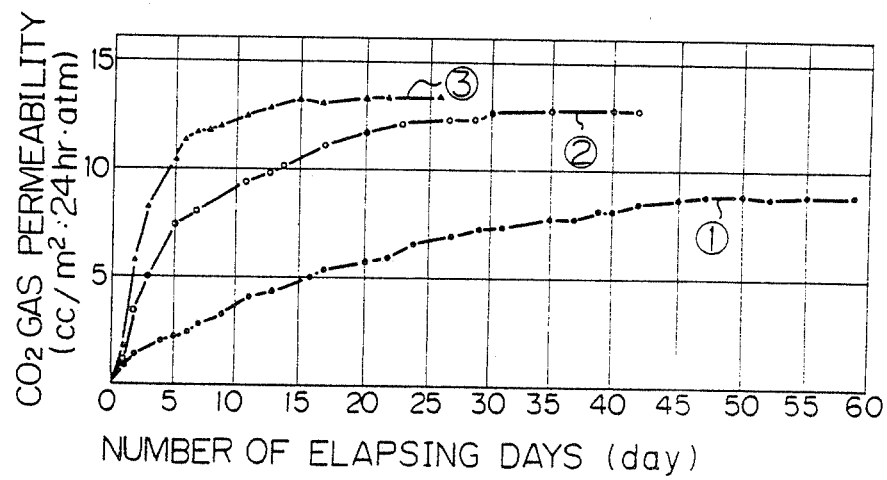
FIGS. 30 and 31 are graphs showing the relation between the carbon dioxide gas permeability and the number of elapsing days.

In order to sufficiently confirm the effect of the present invention, with respect to each laminate, the measurement was conducted for a long time until the stable gas permeation state was sufficiently attained. The relation between the number of elapsing day and the carbon dioxide gas permeability, observed with respect to each laminate, is shown in FIG. 30. In FIG. 30, curve 1 shows the results obtained with respect to the Barex/paper/Barex laminate of the present invention, curve 2 shows the results obtained with respect to the Barex/air layer/Barex laminate, and curve 3 shows the results obtained with respect to the laminate disclosed in the above Japanese patent reference.

Incidentally, the Barex 210 film used in this example is a film formed by the inflation method from a nitrile resin supplied by Vistron Co., that is, a nitrile rubber reinforced copolymer comprising 75% by weight of acrylonitrile and 25% by weight of methyl acrylate. The carbon dioxide gas permeability of this film after attainment of the stable permeation state at 50° C. was 29.5 cc/m$^2$·24 hrs·atm in case of a film thickness of 50 μm or 15.8 cc/m$^2$·24 hrs·atm in case of a film thickness of 100 μm.

The excellent effect of the present invention is apparent from FIG. 30. More specifically, the carbon dioxide gas permeability of the laminate structure of the present invention after attainment of the stable permeation state was 8.8 cc/m$^2$·24 hrs·atm, whereas the carbon dioxide gas permeabilities of the Barex/air layer/Barex laminate structure and the 2-ply structure after attainment of the stable permeation state were 12.8 and 13.4 cc/m$^2$·24 hrs·atm, respectively.

With respect to each sample, the transition period, that is, the time required for the gas permeability to be increased to 90% of the gas permeability after attainment of the stable gas permeation state, was measured. It was found that the transition period was 38 days, while the transition period was 18 days in case of the Barex/air layer/Barex laminate structure or 9 days in case of the 2-ply laminate structure.

From the foregoing results, it has been found that according to the present invention, the permeability after attainment of the stable gas permeation state was reduced to about 55% of the gas permeability of the single film having a thickness of 100 μm. Thus, it has been confirmed that an excellent gas barrier property can be attained by the structure of the present invention.

Moreover, the transition period was greatly prolonged in the laminate structure of the present invention. It will readily be understood that when the structure of the present invention is applied to a vessel for beer or carbonated drink, great practical merits are attained.

In this example, the measurement was carried out at 50° C., and in case of the laminate structure of the present invention, the transition period of 38 days was obtained. At practical shelf temperatures applied to vessels for beer or carbonated drink, this transition period will considerably be prolonged, and a much higher effect will practically be attained. It will readily be understood that the gas barrier effect attained by the present invention is very excellent.

EXAMPLE 2

The same laminate structure as described in Example 1 was prepared in the same manner as described in Example 1 except that lamination of paper with the Barex 210 film was effected by using a urethane type adhesive (solid content=25%, solvent=ethyl acetate), and the carbon dioxide gas permeability was measured in the same manner as described in Example 1. The carbon dioxide gas permeability after attainment of the stable permeation state was 8.5 cc/m$^2$·24 hrs·atm and the transition period was 40 days.

EXAMPLE 3

The same sample comprising paper and Barex 210 sheet as a spacer, as used in Example 1, was laminated with a gas barrier film selected from a Barrialon film having a thickness of 64 μm ("CX26" supplied by Asahi Kasei Kogyo K.K.), a nylon 6 film having a thickness of 50 μm, a biaxially oriented polyester film having a thickness of 100 μm, an Eval film having a thickness of 25 μm ("EF-E" supplied by Kuraray K.K.) and a polyvinylidene chloride-coated, biaxially oriented polypropylene film having a thickness of 22 μm according to a lamination method shown in Table 2 to obtain a laminate having a gas barrier film/paper/gas barrier film structure shown in FIG. 28. The carbon dioxide gas permeability was measured according to the same method as adopted in Example 1. The measurement temperature is shown in Table 2. Incidentally, the measurement was carried out at a relative humidity of 0%. The obtained results are shown in Table 2.

In order to clarify the effect of the present invention, with respect to each gas barrier film, a comparative laminate similar to that prepared in Example 1, that is, a laminate having a gas barrier film/air layer/gas barrier film structure, was prepared, and the carbon dioxide gas barrier property was measured. The obtained results are shown by parenthesized values in Table 2.

From the results shown in Table 2, it will readily be understood that excellent gas barrier effects can be attained according to the present invention. Assuming that the carbon dioxide gas permeability of the single layer film having a thickness equal to that of the gas barrier film/paper/gas barrier film structure was ½ of the carbon doxide gas permeability of the single layer film shown in Table 2, the carbon dioxide gas permeability of the laminate structure of the present invention was 50 to 60% of the estimate value of the single layer film having a thickness equal to that of the laminate, while the carbon dioxide gas permeability of the comparative gas barrier film/air layer/gas barrier film structure was 80 to 90% of this estimate value. Furthermore, the transition period of the laminate structure of the present invention was about 2 times as long as the transition time of the comparative structure.

TABLE 2

| Gas Barrier Film | Measurement Temperature (°C.) | Carbon Dioxide Gas Permeability (cc/m² · 24 hrs · atm) of Single Layer Film Used | Gas Barrier Film/Paper/Gas Barrier Film Structure | |
|---|---|---|---|---|
| | | | Lamination Method | Transition Period (days) | Carbon Dioxide Gas Permeability (cc/m² · 24 hrs · atm) after Attainment of Stable Gas Permeation State |
| Barrialon, 64 μm | 23 | 33 | Hot fusion bonding, 125° C. | 21 (12) | 10 (14) |
| Nylon 6, 50 μm | 23 | 77 | Urethane type adhesive | 12 (7) | 23 (34) |
| Biaxially oriented polyester film, 100 μm | 23 | 115 | Ethylene acrylate type adhesive | 10 (6) | 32 (45) |
| Eval, 25 μm | 50 | 16 | Urethane type adhesive | 58 (24) | 3.8 (7.1) |
| Polyvinylidene chloride-coated, biaxially oriented polypropylene film, 22 μm | 23 | 40 | Urethane type adhesive | 30 (17) | 11 (18) |

COMPARATIVE EXAMPLE 1

A gas barrier film/paper/gas barrier film laminate structure and a gas barrier film/air layer/gas barrier film laminate were prepared in the same manner as described in Example 3 by using a biaxially oriented polyester film having a thickness of 50 μm as the gas barrier film, and the carbon dioxide gas permeability was measured at 23° C. In case of the gas barrier film/paper/gas barrier film laminate, the transition period was 6 days and the carbon dioxide gas permeability after attainment of the stable permeation state was 72 cc/m²·24 hrs·atm, and in case of the gas barrier film/air layer gas barrier film laminate, the transition period was 4 days and the carbon dioxide gas permeability after attainment of the stable permeation state was 90 cc/m²·24 hrs·atm. Incidentally, the biaxially oriented polyester film having a thickness of 50 μm, which was used in this example, had a carbon dioxide gas permeability of 210 cc/m²·24 hrs·atm after attainment of the stable gas permeation state.

From the foregoing results, it is seen that if the carbon dioxide gas permeability of a gas barrier film to be laminated exceeds 200 cc/m²·24 hrs·atm, though the effect of the present invention is attained, the effect is lower than the effect attainable by a film having a high gas barrier property. It also is seen that in case of a film having such a high carbon dioxide permeability as described above, even though the effect of the present invention is attained, the absolute value of the carbon dioxide gas permeability is large, the laminate can satisfy the requirement of the gas barrier property for a vessel for beer or carbonated drink.

EXAMPLE 4

A pulp mixture comprising 70% by weight of a wood pulp and 30% by weight of a synthetic pulp composed of polyethylene was suspended in air and uniformly scattered to obtain a non-woven fabric mat having a basis weight of 800 g/m². The mat was inserted in a heating press and pressed at a temperature of 150° under a pressing pressure of 15 kg/cm² to obtain a sheet having a thickness of 600 μm. In the same manner as described in Example 1, a Barex 210 sheet having a thickness of 600 μm was arranged as a spacer along the periphery of the obtained sheet, and both the surfaces of the sheet were laminated with a Barex 210 film having a thickness of 50 μm to obtain a laminate having a Barex/non-woven sheet/Barex structure similar to the structure obtained in Example 1. A urethane type adhesive was used for the lamination as in Example 2.

The carbon dioxide gas permeability was measured at a temperature of 50° C. and a relative humidity of 0%. It was found that the carbon dioxide gas permeability of the laminate after attainment of the stable gas permeation state was 9.0 cc/m²·24 hrs·atm and the transition period was 36 days.

EXAMPLE 5

Figure 31:
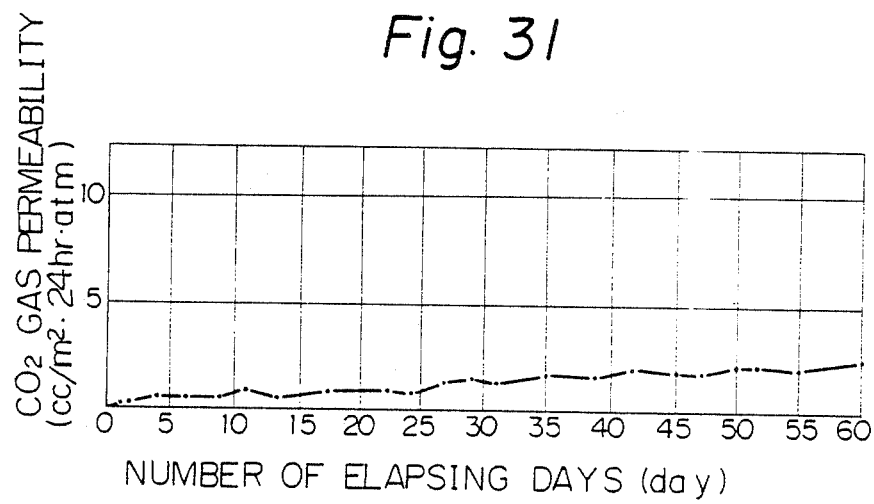

Two laminates shown in FIG. 28 were prepared in the same manner as described in Example 1, and they were piled together and the confronting surfaces were entirely bonded to each other by heat fusion bonding to obtain an integrated Barex/paper/Barex/Barex/paper/Barex laminate. The carbon dioxide gas permeability of this laminate comprising two paper layers was measured at a temperature of 50° C. and a relative humidity of 0%. The obtained results are shown in FIG. 31. The measurement was conducted for 60 days, but the stable gas permeation state was not attained during this period. The carbon dioxide gas permeability of the laminate after the lapse of 60 days was 2.4 cc/m²·24 hrs·atm.

EXAMPLE 6

Both the surfaces of the same bleached kraft paper having a basis weight of 230 g/m², as used in Example 1, were laminated with a Barex 210 film having a thickness of 35 μm by using a urethane type adhesive (solid content=25%, solvent=ethyl acetate) to obtain a laminated paper 1 of a Barex/paper/Barex structure shown in FIG. 32. By using this laminated paper, a cylindrical barrel having a sectional shape as shown in FIG. 11-(a) was prepared according to procedures shown in FIGS. 32-(a) and 32-(b) illustrating an embodiment of the barrel of the present invention. More specifically, the above-mentioned laminated paper 111 was subjected to the edge treatment with a Barex tape 112 having a thickness of 50 μm, and the laminated paper 111 was wound 2 times around a mandrel [see FIG. 32-(a)], and the confronting surfaces were entirely bonded to each other by heat fusion bonding to obtain an integrated two-wall barrel [see FIG. 32-(b)], which had an inner diameter of 7.5 cm and a height of 15.0 cm and in which the outer and inner end portions of the laminated paper were lapped along about 3 cm and a three-layer structure was formed in this lapped portion. A load was applied to this barrel in the vertical direction at a temperature of 23° C. and a relative humidity of 50%. The load under which the barrel began to deform, that is, the buckling strength, was 150 kg.

A bleached kraft pulp of soft wood was mixed with 5, 10, 20, 30, 40, 50 or 60% by weight of a synthetic pulp composed of polyethylene and the pulp mixture was suspended in air and uniformly scattered to obtain a non-woven fabric mat having a basis weight of 1.6 kg/m². The mat was inserted in a mold and pressed at a mold temperature of 150° C. under a pressing pressure of 30 kg/cm² for 1 minute to obtain a molded lid member as shown in FIG. 4, which had a spherical portion radius of 75 mm, a skirt portion length of 10 mm and a thickness of 1.5 mm.

Under the same heating and molding conditions, a plate having a thickness of 1.5 mm was molded, and the tensile strength at break of this plate was measured at a pulling speed of 20 mm/min by using a specimen having a width of 15 mm and a bench mark distance of 180 mm.

The surface condition of the molded lip was observed with the naked eye, and the degree of wrinkling in the skirt portion and the presence or absence of tearing were especially checked.

Both the surfaces of the lid were laminated with a Barex 210 film having a thickness of 60 μm by using a urethane type adhesive to impart a gas barrier property and water proofness to the lid.

This lid was fittted in one opening of the barrel and was tightly bonded and secured to the barrel by heat fusion bonding.

A water-pouring metal lid was attached to the other opening of the barrel, and compressed water was supplied into the vessel while keeping the barrel in the horizontal posture so that deformation of the paper lid could be observed. The water pressure under which the vessel was broken was measured.

The obtained results are shown in Table 3.

As is seen from the results shown in Table 3, when the mixing ratio of the synthetic pulp was 5% by weight, the tensile strength at break was low and the moldability was insufficient, and when the inner pressure was imposed, deformation of the lid was large and the outer periphery of the spherical portion of the lid was broken under 4.2 kg/cm² G. If the mixing ratio of the synthetic pulp was 60% by weight, the moldability was good but the tensile strength at break was relatively low, and when the inner pressure was applied, deformation of the lid was relatively large.

Incidentally, each pressure resistance in Table 3 indicates the pressure under which the bonded portion between the barrel and lid was broken, except the case of the lid containing 5% by weight of the synthetic pulp.

From the results shown in Table 3, it will readily be understood that the mixing ratio of a synthetic pulp in a non-woven fabric mat used for a lid of the pressure-resistant paper vessel of the present invention is preferably from 10 to 50% by weight.

TABLE 3

| Mixing Ratio (% by weight) of Synthetic Pulp | Tensile Strength at Break (kg/cm²) | Moldability | Pressure Resistance (kg/cm²G) |
| --- | --- | --- | --- |
| 5 | 145 | C | 4.2 |
| 10 | 210 | B | 7.5 |
| 20 | 245 | B | 8.5 |

TABLE 3-continued

| Mixing Ratio (% by weight) of Synthetic Pulp | Tensile Strength at Break (kg/cm²) | Moldability | Pressure Resistance (kg/cm²G) |
| --- | --- | --- | --- |
| 30 | 250 | A | 9.0 |
| 40 | 240 | A | 8.3 |
| 50 | 225 | A | 7.7 |
| 60 | 190 | A | 5.8 |

Incidentally, the moldability was evaluated according to the following rating:
A: good
B: some wrinkles formed in the skirt portion
C: wrinkling and tearing caused in the skirt portion

EXAMPLE 7

A barrel having a sectional shape as shown in FIG. 11-(b) was prepared from the Barex/paper/Barex laminated paper used in Example 6, in which the thickness of the Barex film was 35 μm, according to procedures shown in FIGS. 33-(a), 33-(b) and 33-(c).

More specifically, the above-mentioned laminated paper 111 edge-treated with a Barex tape having a thickness of 50 μm was wound one time around a mandrel so that the edge portions were lapped together along 3 cm [see FIG. 33-(a)], and the lapped portion was heat-fusion-bonded to form an inner cylinder A. Then, the same laminated paper was wound on the inner cylinder A so that the edge portions were lapped together along 3 cm and the lapped portion was separate by 180° from the lapped portion of the inner cylinder [see FIG. 33-(b)], whereby an outer cylinder B was formed. The confronting Barex films of the inner and outer cylinders were entirely bonded by heat fusion bonding to obtain an integrated cylindrical barrel having an inner diameter of 75 mm and a height of 150 mm [see FIG. 33-(c)]. The buckling strength of the obtained barrel was 154 kg.

A non-woven fabric mat formed from a pulp mixture comprising 70% by weight of a bleached kraft pulp of soft wood and 30% by weight of a synthetic pulp composed of polyethylene was press-molded into a sheet having a thickness of 2 mm at 150° C. under 15 kg/cm². Both the surfaces of the sheet was laminated with a Barex film having a thickness of 60 μm by heat fusion bonding and the laminated sheet was punched into discs having a diameter of 10 cm. The disc was inserted in a mold and heated and pressed at a mold temperature of 150° C. under a pressing pressure of 30 kg/cm² to obtain a lid having a spherical portion radius of 75 mm, a skirt portion length of 10 mm and a thickness of 1.5 mm. Two lids were prepared as top and bottom lids in the above-mentioned manner.

Figure 34:
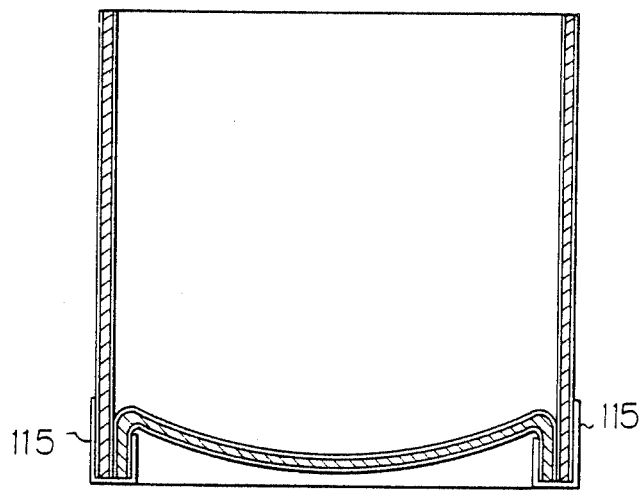
FIG. 34 is a sectional view showing an example of the state of bonding between the barrel portion and lid member of the pressure-resistant vessel.

A hole having a diameter of 3 cm was perforated in the top lid and a metal cap was attached to the hole-perforated portion. The top and bottom lids were fitted in both the end portions of the above-mentioned barrel and tightly bonded to the barrel by heat fusion bonding of the skirt portions. The paper-exposed portions of the barrel and lids on both the ends of the vessel were covered with a Barex film 115 as shown in FIG. 34. The inner capacity of the obtained vessel was 550 cc.

The vessel was set at a carbon dioxide gas permeation tester (Permatran Model C-IV supplied by Mocon Co.), and the carbon dioxide gas permeability of the vessel as a whole was measured at 50° C. The carbon dioxide gas permeability of the vessel was 0.1 cc/24 hrs·atm per vessel at the point when 20 days had passed from the start of the measurement.

For comparison, the carbon dioxide gas permeability of a commercially available polyester beer bottle having a capacity of 2 l was measured under the same conditions as described above. The carbon dioxide gas permeability was 13.5 cc/24 hrs·atm per vessel at the point when 5 days had passed from the start of the measurement.

Commercially available beer cooled to 0° C. was filled in the vessel, and a pressure gauge was attached to the metal cap of the top lid and the vessel was completely closed. The vessel was immersed in a water bath maintained at 50° C. for 1 hour, and the vessel was taken out and examined. The spherical portion of the lid was slightly deformed, but deformation was not observed in other portions and no reduction of the pressure was detected. At this point, the inner pressure of the vessel by beer was 4.2 kg/cm$^2$ G. When compressed water was supplied into the above-mentioned vessel at normal temperature, the bonded portion was broken under a pressure of 8.8 kg/cm$^2$ G.

From the above experimental results, it will readily be understood that the above-mentioned vessel according to the present invention is excellent in the pressure resistance, buckling strength and carbon dioxide gas barrier property and can advantageously be used as a vessel for beer or carbonated drink.

EXAMPLE 8

A laminated paper having a Barrialon film/paper/Barrialon film structure was prepared by using a Barrialon CX26 film having a thickness of 64 μm and the same paper as used in Example 6, and a laminated paper having a polyethylene/paper/polyethylene structure was prepared by extrusion-laminating polyethylene films having a thickness of 60 μm on both the surfaces of the same paper as used in Example 6.

A barrel having the same size and structure as those of the barrel prepared in Example 7 was prepared by using the above-mentioned two laminated papers. The Barrialon film/paper/Barrialon film laminate was used for the inner cylinder, and the polyethylene/paper/polyethylene laminate was used for the outer cylinder. A Barrialon CX26 film was used for the edge treatment. The buckling strength of the barrel was 145 kg.

Top and bottom lids were prepared in the same manner as described in Example 7 except that the film laminated on each surface of the mat was a Barrialon CX26 film. The top and bottom lids were fitted in the end portions of the barrel and were tightly bonded and secured to the barrel by heat fusion bonding. The paper-exposed portions of the barrel and lids on both the ends of the vessel were covered with a film having a thickness of 128 μm, which was obtained by bonding two Barrialon CX26 films.

The carbon dioxide gas permeability of the vessel was 0.7 cc/24 hrs·atm per vessel at 23° C. at the point when 10 days had passed from the start of the measurement.

The above vessel was filled with beer and immersed in a water bath maintained at 50° C. for 1 hour. The spherical portion of the lid was slightly expanded but no other deformation was observed and reduction of the pressure was not caused. At the pressure resistance test using compressed water, it was found that the bonded portion was broken under 8.0 kg/cm$^2$ G.

EXAMPLE 9

Figure 15:
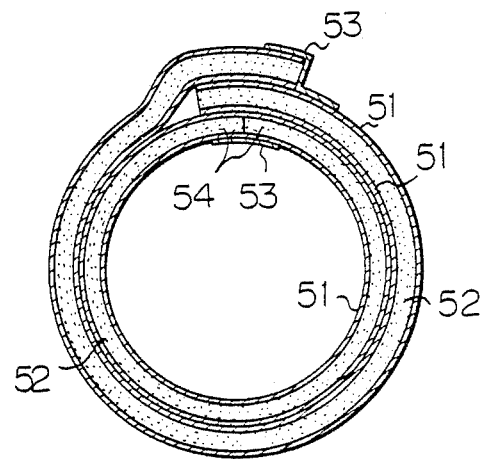
FIG. 15 is a sectional view showing the barrel portion of a pressure-resistant vessel formed by winding two times a laminated paper as in FIG. 10.
Figure 16:
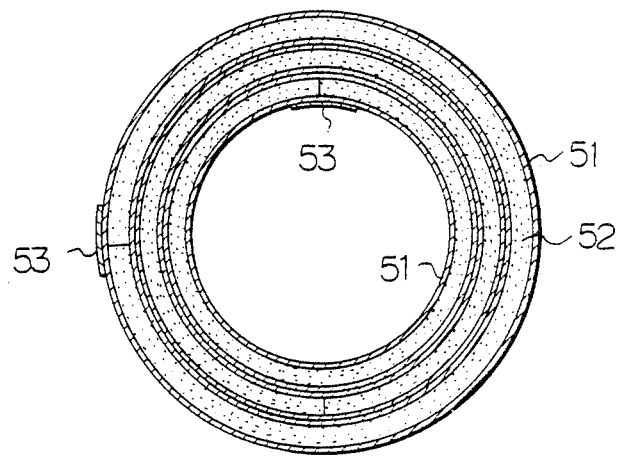
FIG. 16 is a sectional view showing the barrel portion of a pressure-resistant vessel formed by winding three times a laminated paper as shown in FIG. 10.

A barrel having a sectional structure shown in FIG. 15 was prepared by using the same Barrialon CX26 film/paper/Barrialon CX26 film laminate as used in Example 8.

More specifically, the edges 54 of the laminated paper for the inner cylinder were butt-bonded by heat fusion bonding through a Barrialon CX-26 tape 53. Then, the laminated paper for the outer cylinder was wound on the so-formed inner cylinder so that the edges of the laminated paper were lapped along 3 cm and the edge portion of the outer cylinder was piled on the edge portion of the inner cylinder. The confronting surfaces of the inner and outer cylinders were entirely heat-fusion-bonded to form an integrated barrel having an inner diameter of 7.5 cm and a height of 15 cm. The buckling strength of the barrel was 140 kg.

The same top and bottle lids as used in Example 8 were prepared, and they were fitted in both the end portions of the barrel and were tightly bonded and secured to the barrel by heat fusion bonding. A circular ring of polyethylene having an outer circumference diameter of 72 mm and a section diameter of 3 mm was molded and the ring was inscribed to the bonded portion of each lid as shown in FIG. 24. More specifically, the circular ring 74 was inscribed to the curved edge part 72b of the lid 72 in which the outer circumference radius of the curved edge part 72b was 3 mm and the inner circumference radius thereof was 1.5 mm. The circular ring 74 was secured by a stopper 75 composed of a non-woven fabric mat and having a thickness of 2 mm. The stopper 75 was tightly bonded to the skirt portion 72c of the lid 72 and integrated therewith.

The paper-exposed portions of the barrel and lids on both the ends of the vessel were treated in the same manner as described in Example 8.

The carbon dioxide gas permeability of the vessel was 0.3 cc/24 hrs·atm per vessel at 23° C. at the point when 10 days had passed from the start of the measurement.

Artificial carbonated liquid formed by reacting dilute sulfuric acid with sodium hydrogencarbonate was filled in the vessel, and a pressure gauge was set at the opening of the top lid and the vessel was completely closed.

The vessel was allowed to stand still at 23° C. for 1 month. Incidentally, this test was carried out by using 5 sample vessels. The pressure at the time of filling and the pressure after 1 month in each sample vessel are shown in Table 4.

From the results shown in Table 4, it is seen that in the pressure-resistant paper vessel of the present invention, reduction of the inner pressure due to permeation of carbon dioxide gas is not substantially caused, and an excellent effect can be attained according to the present invention.

In each sample vessel, no substantial deformation was caused even after the elapse of 1 month, and deformation as shown in FIG. 23 was not caused in the bonded portion.

TABLE 4

| Sample No. | Pressure (kg/cm$^2$G) at the Time of Filling | Pressure (kg/cm$^2$G) after 1 Month |
|---|---|---|
| 1 | 2.6 | 2.5 |
| 2 | 2.7 | 2.5 |
| 3 | 2.4 | 2.4 |
| 4 | 2.5 | 2.4 |

TABLE 4-continued

| Sample No. | Pressure (kg/cm²G) at the Time of Filling | Pressure (kg/cm²G) after 1 Month |
| --- | --- | --- |
| 5 | 2.6 | 2.5 |

EXAMPLE 10

Both the surfaces of bleached kraft paper having a basis weight of 250 g/m² were laminated with a Barex 210 film having a thickness of 35 μm by using a urethane adhesive (solid content=25%, solvent=ethyl acetate) to form a laminated paper having a Barex film-/paper/Barex film structure.

The laminated paper was arranged so that the paper-making direction of the paper was in alignment with the axial direction of the vessel and the laminated paper was wound one time around a mandrel so that both the edge portions of the laminated paper were lapped together along 1.5 cm. The lap portion was heat-fusion-bonded to form an inner cylinder. The paper-exposed portions on the edges were edge-treated with a Barex tape having a thickness of 50 μm so that the paper-exposed portions were prevented from falling in contact with the content. The same laminated paper as described above was arranged so that the paper-making direction of the paper was in alignment with the circumferential direction of the vessel, and the laminated paper was wound on the inner cylinder so that the edge portion was separate by 180° from the bonded edge portion of the inner cylinder and both the edges of the laminated paper were lapped along 1.5 cm, whereby an outer cylinder was formed. The confronting Barex films of the inner and outer cylinders were entirely heat-fusion-bonded to form an integrated cylindrical barrel having a sectional shape as shown in FIG. 11-(b) and also having an inner diameter of 75 mm and a height of 150 mm.

The same bottom lid as used in Example 7 was fitted in one end portion of the barrel and was tightly bonded and secured to the barrel by ultrasonic welding.

A water-pouring metal lid was attached to the other opening of the barrel, and the vessel was closed. Compressed water maintained at normal temperature was supplied into the vessel and the pressure was measured when the bonded portion between the barrel and lid was broken. Five sample vessels were used for the measurement. The obtained results are shown in Table 5.

For comparison, a vessel was prepared in the same manner as described above except that the laminated paper for the inner cylinder was arranged so that the paper-making direction of the paper was in alignment with the circumferential direction of the vessel, and the obtained vessel was subjected to the pressure resistance test. The obtained results are shown in Table 5.

From the results shown in Table 5, it will readily be understood that the paper-making direction of paper of the barrel has significant influences on the strength of the bonded portion between the barrel and lid.

TABLE 5

| Sample No. | Pressure Resistance (kg/cm²G) | |
| --- | --- | --- |
| | Present Invention | Comparison |
| 1 | 9.5 | 7.3 |
| 2 | 9.8 | 6.8 |
| 3 | 9.7 | 8.0 |
| 4 | 9.2 | 7.0 |
| 5 | 9.5 | 7.2 |

TABLE 5-continued

| Sample No. | Pressure Resistance (kg/cm²G) | |
| --- | --- | --- |
| | Present Invention | Comparison |
| Average | 9.5 | 7.3 |

EXAMPLE 11

The same Barex film/paper/Barex film laminate as used in Example 10 was wound 3 times around a mandrel, and the paper-exposed parts on the edges of the laminate were edge-treated with a Barex tape having a thickness of 50 μm. The confronting Barex film surfaces of the three-wound laminate were entirely heat-fusion-bonded to form an integrated cylindrical barrel having an inner diameter of 75 mm and a height of 150 mm. A Barex 210 tape having a thickness of 100 μm and a width of 20 mm was heat-fusion-bonded on one and portion of the barrel along the entire circumference of the barrel.

The same lid as used in Example 10 was fitted in the tape-bonded end portion of the barrel and was tightly bonded and secured to the barrel by ultrasonic welding to form a bonded portion having a structure as shown in FIG. 18. Then, a water-pouring metal lid was atttached to the other opening of the barrel and the vessel was closed, and compressed water was supplied at normal temperature and the pressure was measured when the bonded portion between the barrel and lid was broken. Five sample vessels were used for the measurement. The obtained results are shown in Table 6.

For comparison, a vessel was prepared in the same manner as described above except that the Barex tape was not bonded to the end portion of the barrel, and the vessel was subjected to the pressure resistance test in the same manner as described above. The obtained results are shown in Table 6.

From the results shown in Table 6, it is seen that application of a plastic tape to the bonded portion between the barrel and lid is very effectively for increasing the strength of the bonded portion.

TABLE 6

| Sample No. | Pressure Resistance (kg/cm²G) | |
| --- | --- | --- |
| | Present Invention | Comparison |
| 1 | 11.7 | 8.0 |
| 2 | 11.0 | 8.2 |
| 3 | 11.5 | 7.5 |
| 4 | 12.5 | 7.8 |
| 5 | 11.2 | 7.0 |
| Average | 11.6 | 7.7 |

EXAMPLE 12

A cylindrical two-wall structure barrel having a sectional shape as shown in FIG. 11-(b) was prepared by using the same Barex film/paper/Barex film laminate as used in Example 10. In this barrel, the inner diameter was 75 mm, the height of the inner cylinder was 150 mm, and the height of the outer cylinder was 162 mm. Namely, the height of the outer cylinder was made larger by 12 mm than the height of the inner cylinder so that one end of the outer cylinder could be folded inward.

The same lid as used in Example 10 was fitted in the end portion of the barrel and the end portion of the outer cylinder was folded inward. By heat fusion bonding, the outer peripheral surface of the skirt portion of the lid was tightly bonded and secured to the inner circumferential surface of the barrel and the inner circumferential surface of the skirt portion of the lid was tightly bonded and secured to the folded portion of the outer cylinder to form a bonded portion having a structure as shown in FIG. 22.

A water-pouring metal lid was attached to the other opening of the barrel and the vessel was closed, and compressed water was supplied at normal temperature and the pressure was measured when the bonded portion between the barrel and lid was broken. Five sample vessels were used for the measurement. The obtained results are shown in Table 7.

For comparison, a barrel having a bonded portion having a structure as shown in FIG. 4 was prepared in the same manner as described above except that the height of the outer cylinder was made equal to the height of the inner cylinder. The same lid as described above was tightly bonded and secured to the barrel by heat fusion bonding. The obtained vessel was subjected to the pressure resistance test in the same manner as described above. The obtained results are shown in Table 7.

From the results shown in Table 7, it will be understood that the structure for the bonded portion, shown in FIG. 22, is effective for increasing the strength of the bonded portion.

TABLE 7

| Sample No. | Pressure Resistance ($kg/cm^2 G$) | |
| --- | --- | --- |
| | Present Invention | Comparison |
| 1 | 10.1 | 7.3 |
| 2 | 9.6 | 6.8 |
| 3 | 9.8 | 8.0 |
| 4 | 10.3 | 7.0 |
| 5 | 10.3 | 7.2 |
| Average | 10.0 | 7.3 |

We claim:

1. A pressure-resistant paper vessel having a pressure resistance at normal temperature of higher than atmospheric pressure but not higher than 10 $kg/cm^2$ G, at least one surface of said paper vessel with which a pressurized liquid falls into contact, being laminated with a gas barrier plastic film having a carbon dioxide gas permeability of not more than 200; the major portion of the inner surface of said paper vessel with which the pressurized liquid falls into contact, being curved;
   said paper vessel being comprised of top and bottom lid members and a vessel barrel portion;
   each of said top and bottom lid members being made of pulp, having a thickness of from 0.3 to 3 mm, and having skirt portions on the peripheral edges thereof, with a substantial portion of said lid members having a curved surface, and said skirt portions being substantially free from wrinkles;
   said vessel barrel portion being made of a paper having a basic weight of 70 to 500 $g/m^2$ and having a cylindrical configuration comprising a tightly bonded multiple layered structure containing at least two papers.

2. The pressure-resistant paper vessel as set forth in claim 1 wherein the paper in each of the top and bottom lid members is made by forming a non-woven fabric mat from pulp containing 10 to 50% by weight of a synthetic pulp according to the dry method, and then, press-shaping the non-woven fabric at an elevated temperature.

3. The pressure-resistant paper vessel as set forth in claim 1 wherein said vessel barrel comprises at least one layer having a film/paper/film laminate structure, wherein both surfaces of the paper are laminated with a gas barrier plastic film having a carbon dioxide gas permeability of not more than 200 and wherein the peripheral edge of the paper is also laminated with the same gas barrier plastic film or a gas barrier plastic resin having a carbon dioxide gas permeability of not more than 200.

4. The pressure-resistant paper vessel as set forth in claim 3, wherein said vessel barrel further comprises at least one having a tightly bonded gas barrier plastic film/gas barrier plastic film laminate structure.

5. The pressure-resistant paper vessel as set forth in claim 1 wherein each of said top and bottom lid members comprises at least one layer having a film/paper/film laminate structure wherein both surfaces of the paper are laminated with a gas barrier plastic film having a carbon dioxide gas permeability of not more than 200 and the peripheral edge of the paper is also laminated with the same gas barrier plastic film or a gas barrier plastic resin having a carbon dioxide gas permeability of not more than 200.

6. The pressure-resistant vessel as set forth in claim 5, wherein each of said top and bottom lid members further comprises at least one layer having a tightly bonded gas barrier plastic film/gas barrier plastic film laminate structure.

7. The pressure-resistant vessel as set forth in claim 1, wherein said vessel barrel has a double-wall cylindrical configuration comprising two superimposed inner and outer layers, said inner layer having a laminate structure comprising a paper with at least one surface thereof being laminated with the gas barrier plastic film
   the edges of the inner layer of the two superimposed layers extending along the axis of the vessel barrel being butt-bonded with each other and the edges of the outer layer of the vessel barrel being lap-bonded over each other so that the lap-bonded edge portions of the outer layer are disposed on the butt-bonded edges of the inner layer.

8. The pressure-resistant paper vessel as set forth in claim 1, wherein said vessel barrel has a triple-wall cylindrical configuration comprising three superimposed inner, middle and outer layers, said inner layer having a laminate structure comprising a paper with at least one surface thereof being laminated with the gas barrier plastic film,
   the edges of each of the three superimposed layers which extend along the axis of the vessel barrel being butt-bonded with each other, said butt-bonded portions being staggered so as not to overlap with each other.

9. The pressure-resistant paper vessel as set forth in claim 1, wherein at least one surface of the paper falling into contact with a pressurized liquid is laminated with the gas barrier plastic film, said paper having its paper-making direction in alignment with the axial direction of the paper vessel.

10. The pressure-resistant paper vessel as set forth in claim 9, comprising an outer layer having a laminate structure comprised of a paper,
    said paper in the outer layer having its paper-making direction in alignment with the circumferential direction of the paper vessel.

11. The pressure-resistant paper vessel as set forth in claim 1, wherein a film or sheet of a thermoplastic resin having a width larger than the effective bonding width of the skirt portion of the lid member is applied to the surface of the vessel barrel to which the skirt portion of the lid member is to be bonded and along the entire circumference of said surface of the vessel barrel.

12. The pressure-resistant paper vessel as set forth in claim 1, wherein the lid member has on the peripheral edge thereof a skirt portion to be fitted to the vessel barrel, said skirt portion being folded toward the inner circumferential edge of the vessel barrel, the outer peripheral surface of the skirt portion of the lid member being bonded to the inner circumferential surface of the vessel barrel, and the end portion of the paper constituting the outer layer of the vessel barrel being folded inward and said folded portion being tightly bonded to the skirt portion of the lid member so that the folded portion covers the skirt portion of the lid member.

13. The pressure-resistant paper vessel as set forth in claim 12, wherein said vessel barrel has an outer layer having a laminate structure comprised of a paper, at least the inner surface of which is laminated with the gas barrier plastic film.

* * * * *